(12) United States Patent
Hughes et al.

(10) Patent No.: US 6,288,688 B1
(45) Date of Patent: Sep. 11, 2001

(54) SYSTEM FOR DISTRIBUTION AND DISPLAY OF ADVERTISEMENTS WITHIN ELEVATOR CARS

(75) Inventors: Bret A. Hughes, Tulsa; Gary N. Fanning, Broken Arrow, both of OK (US)

(73) Assignee: Elevating Communications, Inc., Tulsa, OK (US)

( * ) Notice: Subject to any disclaimer, the term of this patent is extended or adjusted under 35 U.S.C. 154(b) by 0 days.

(21) Appl. No.: 09/111,367

(22) Filed: Jun. 25, 1998

(51) Int. Cl.[7] .................................................. G09G 5/00
(52) U.S. Cl. .................................. 345/1; 187/396
(58) Field of Search ........................ 187/396, 397, 187/393, 391, 247; 345/1, 2

(56) References Cited

U.S. PATENT DOCUMENTS

| | | |
|---|---|---|
| 4,577,177 | 3/1986 | Marubashi . |
| 4,749,062 | 6/1988 | Tsuji et al. . |
| 4,853,678 | 8/1989 | Bishop, Jr. et al. . |
| 4,995,479 | 2/1991 | Fujiwara et al. . |
| 5,056,629 | 10/1991 | Tsuji et al. . |
| 5,360,952 | 11/1994 | Brajczewski et al. . |
| 5,387,769 | 2/1995 | Kupersmith et al. . |
| 5,392,066 | 2/1995 | Fisher et al. . |
| 5,606,154 | 2/1997 | Doigan et al. . |
| 5,642,484 | 6/1997 | Harrison, III et al. . |
| 5,736,967 | 4/1998 | Kayser et al. . |
| 5,844,181 | * 12/1998 | Amo et al. ............................ 187/396 |
| 5,955,710 | * 9/1999 | DiFranza ............................... 187/396 |

FOREIGN PATENT DOCUMENTS

| | | | |
|---|---|---|---|
| 4129846 A1 | 3/1993 | (DE) | ................................ G09G/3/18 |
| WO 91/17530 | 11/1991 | (WO) | ............................... G07G/1/00 |
| WO 97/22066 | 6/1997 | (WO) | ............................... G06F/17/21 |

* cited by examiner

Primary Examiner—Regina Liang
(74) Attorney, Agent, or Firm—Fellers, Snider, Blankenship, Bailey & Tippens, P.C.

(57) ABSTRACT

The invention disclosed herein pertains generally to a method and apparatus for controlling the distribution and display of advertisements and other short messages via a network. It applies more particularly to a system for displaying advertisements to passengers in elevators and similar conveyances, wherein the ultimate source of the messages is remote to the elevator and the messages are conveyed thereto over a computer network. Additionally, it pertains to a system for distributing ads to remote locations for display and retrieving back information from the remote locations relative to the ads displayed. It also pertains to a self-monitoring ad distribution network, wherein equipment failures are automatically reported to a central site.

21 Claims, 15 Drawing Sheets

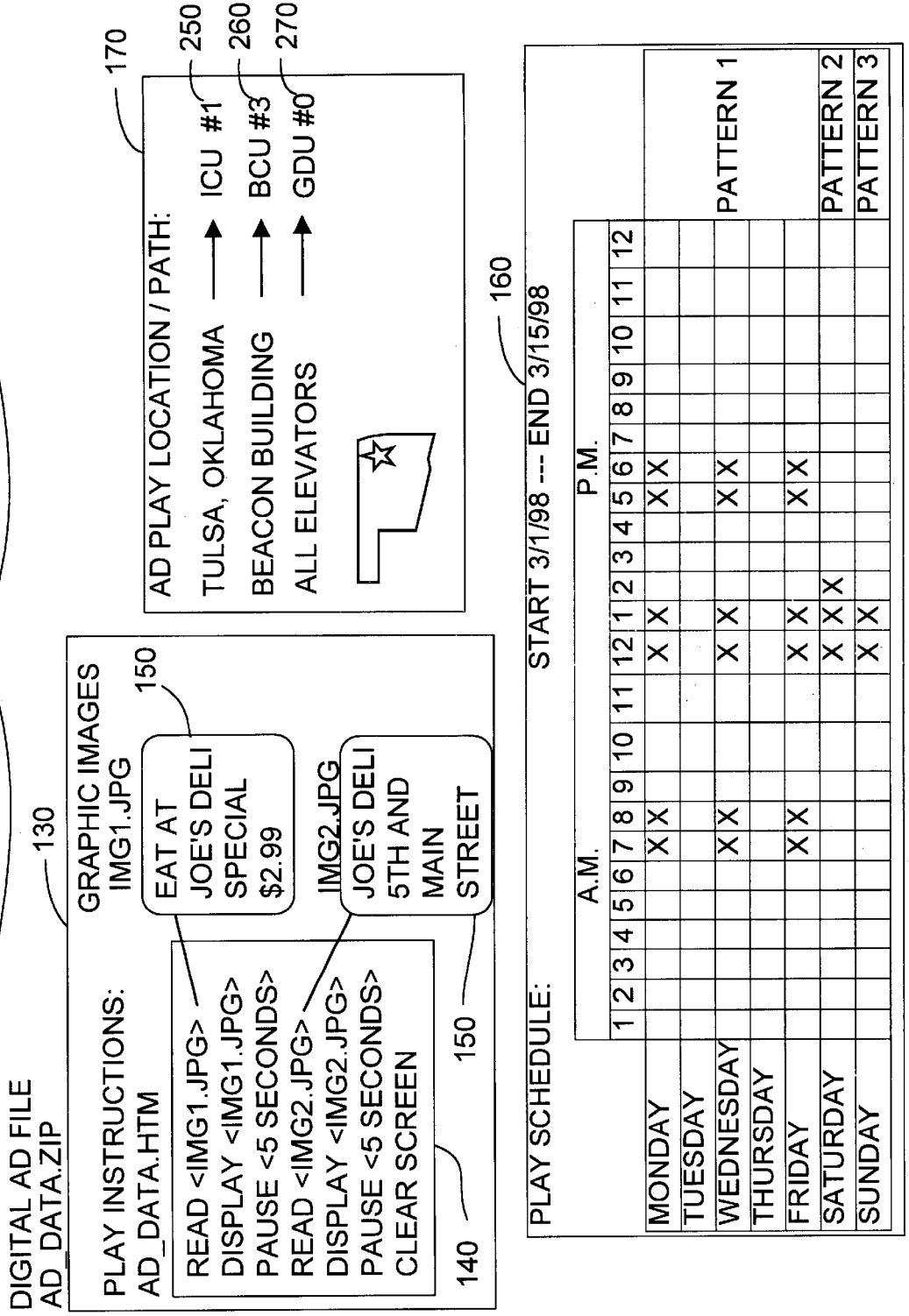

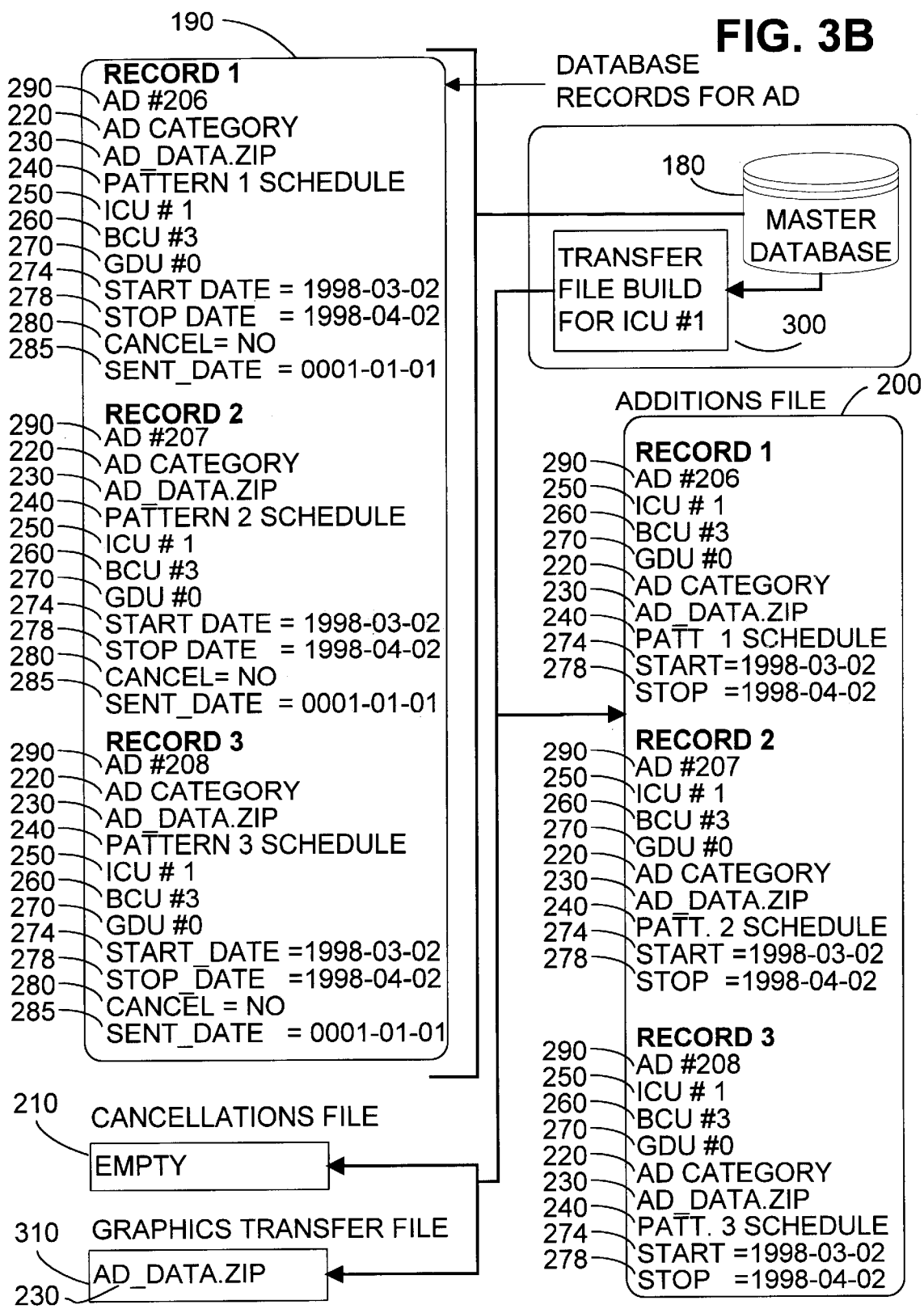

FIG. 4A

| | DAY | | | | | | | | | | | | | | | | | | | | | | | | | DECIMAL VALUE |
|---|---|---|---|---|---|---|---|---|---|---|---|---|---|---|---|---|---|---|---|---|---|---|---|---|---|
| | A.M. | | | | | | | | | | | | P.M. | | | | | | | | | | | | | |
| | 1 | 2 | 3 | 4 | 5 | 6 | 7 | 8 | 9 | # | # | # | 1 | 2 | 3 | 4 | 5 | 6 | 7 | 8 | 9 | # | # | # | |
| PATTERN 1 | | | | | | | X | X | | | | | | | | X | X | | | | | | | | |
| BINARY VALUE | 0 | 0 | 0 | 0 | 0 | 0 | 1 | 1 | 0 | 0 | 0 | 0 | 0 | 0 | 0 | 1 | 1 | 0 | 0 | 0 | 0 | 0 | 0 | 0 | 202944 |
| PATTERN 2 | | | | | | | | X | | | | | X | X | X | | | | | | | | | | |
| BINARY VALUE | 0 | 0 | 0 | 0 | 0 | 0 | 0 | 1 | 0 | 0 | 0 | 0 | 1 | 1 | 1 | 0 | 0 | 0 | 0 | 0 | 0 | 0 | 0 | 0 | 14336 |
| PATTERN 3 | | | | | | | | | | | | | X | X | X | | | | | | | | | | |
| BINARY VALUE | 0 | 0 | 0 | 0 | 0 | 0 | 0 | 0 | 0 | 0 | 0 | 0 | 1 | 1 | 0 | 0 | 0 | 0 | 0 | 0 | 0 | 0 | 0 | 0 | 6144 |

FIG. 4B

| | WEEK | | | | | | | DECIMAL VALUE |
|---|---|---|---|---|---|---|---|---|
| | MON | TUE | WED | THU | FRI | SAT | SUN | |
| PATTERN 1 | X | | X | | X | | | |
| BINARY VALUE | 1 | 0 | 1 | 0 | 1 | 0 | 0 | 84 |
| PATTERN 2 | | | | | | X | | |
| BINARY VALUE | 0 | 0 | 0 | 0 | 0 | 1 | 0 | 2 |
| PATTERN 3 | | | | | | | X | |
| BINARY VALUE | 0 | 0 | 0 | 0 | 0 | 0 | 1 | 1 |

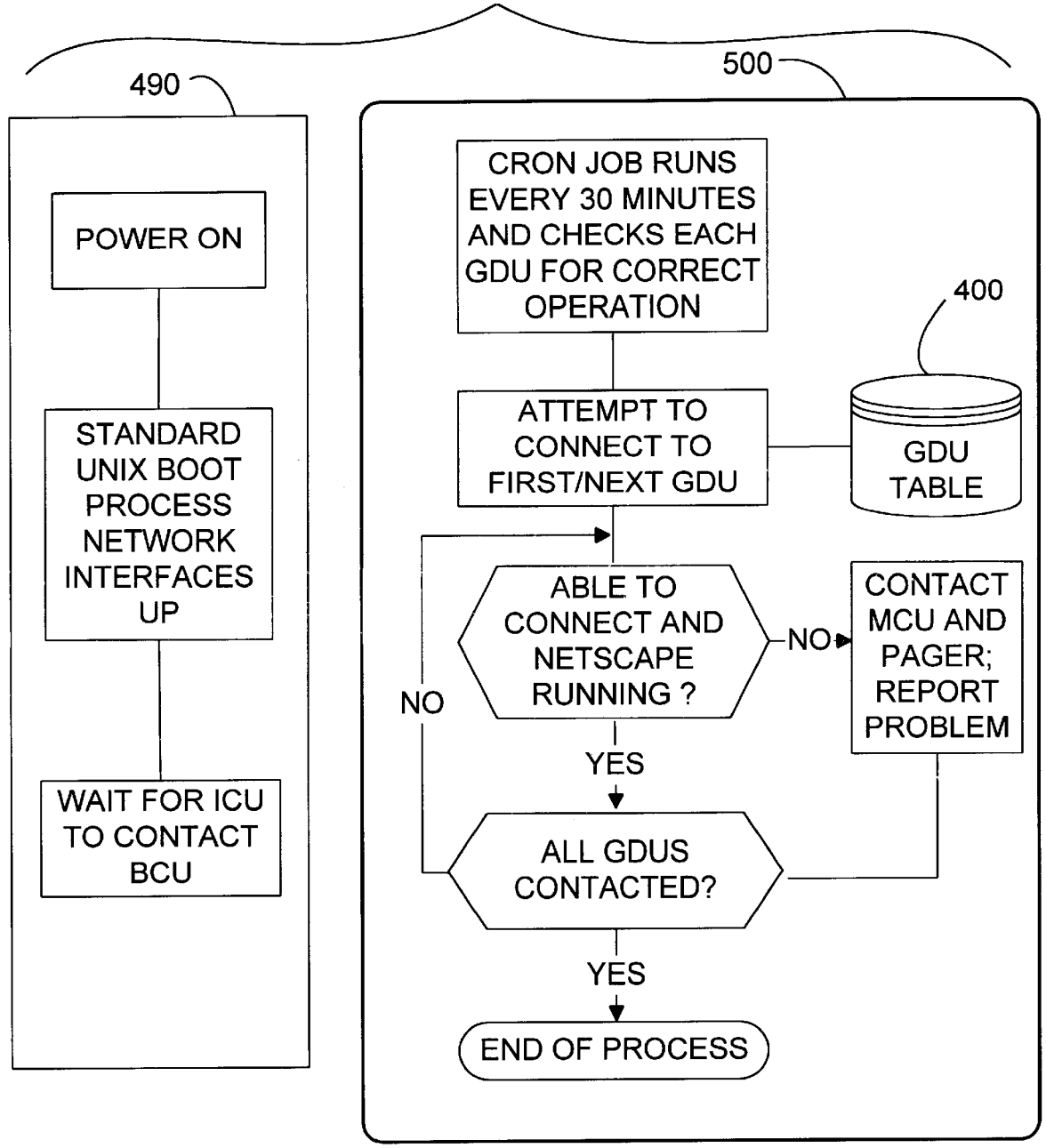

SYSTEM FOR DISTRIBUTION AND DISPLAY OF ADVERTISEMENTS WITHIN ELEVATOR CARS

FIELD OF THE INVENTION

The present invention relates generally to a system for the distribution of advertisements and other short messages to a number of remote sites where display units have been positioned within elevators for viewing by passengers riding therein. In more particular, the invention disclosed herein relates to a system for controlling the distribution, allocation, timing, and display of short messages to elevator passengers over a communications network, and to the automatic monitoring and verification of the delivery of messages sent through this system. It also pertains to the automatic monitoring of the hardware and software status of individual computers within a hierarchical network topology.

BACKGROUND

An ongoing concern among advertisers is that of securing the viewer's attention during the presentation of commercial messages on radio and television. In the case of conventional video and radio broadcast media, there is always a concern that the target audience does not receive the intended message, even if they are watching the program for which the advertising has been purchased. In fact, listeners and viewers have developed a variety of strategies for avoiding conventional commercial messages including using the commercial breaks as an opportunity to pursue short tasks away from the television or radio, "surfing" to other channels during commercials, and simply ignoring the message by "tuning it out." It is well-known that these sorts of activities dilute the impact of an advertiser's message on the viewer/listener and reduce the effective viewership exposed to the message.

There is, however, one captive audience that cannot avail themselves of most of these traditional means of evading advertisements. Additionally, this is an audience that generally would welcome—and attend to—any sort of diversion that might be offered at that particular time and place. The audience that has been described is, of course, passengers within elevators, and especially elevator riders within high-rise buildings. Generally speaking, not only is this a trapped and attentive audience, but it is also an audience that is often nearly desperate for a diversion of any sort. (Consider for example the rapt attention that is often given to the changing elevator floor number display by riders who are attempting to cope with the social consequence of being placed in close physical proximity to a group of total strangers). Additionally, the demographics of the ridership in elevators in high-rise buildings are attractive to many advertisers, as the most frequent passengers in an elevator are likely employed individuals within the building. Thus, these individuals represent a unique audience that most advertisers would dearly love to reach.

In the past, elevator advertising has focused on the use of static displays such as posters. The limitations of posters as advertising media are well-known. Among those limitations are that posters are static displays that cannot be altered except by having an employee pay a visit to the elevator and physically replace it. Additionally, a print-based approach to elevator advertising cannot easily exploit certain well-known behavioral tendencies in large office buildings. In more particular, among many such tendencies are that customers will tend to be more receptive to advertisements related to "morning activities" (e.g., coffee, sweet rolls, restaurants offering breakfast, etc.) as they arrive at work in the morning; more receptive to advertisements for establishments that serve lunch as that time of day nears; more interested in entertainment and dinner dining alternatives as they leave the building for the day; and more receptive to ads related to travel and recreational opportunities near holidays and weekends. However, it is just not economically feasible to exploit these tendencies using a print-based medium, and this is especially true where the number of consumers reached by each ad is relatively small, as it may be within a single elevator car. Additionally, even particular elevators within an office building might have different demographics, which could be exploited by the creative advertiser. For example, a non-stop elevator to the penthouse would tend to carry different sorts of riders (demographics-wise) than a short haul elevator that serves the first 10 floors. Varying the content of print-based ads to reach these different markets would quickly become a logistics and cost nightmare if more than a few elevators were involved.

A natural alternative to a print-based advertising scheme is one that is video—and especially computer—based. This sort of advertising medium certainly would seem, at least on its face, to have the potential to address many of the concerns listed previously and allow an advertiser the flexibility of altering the presentation of ads to match the needs of the riders. However, presenting dynamically scheduled advertising messages to riders in an elevator involves certain unique logistic and technical challenges that might not be encountered in more traditional advertising channels. One obvious consideration from the standpoint of the advertiser with respect to displaying messages via this medium is that the messages must be kept relatively short to permit exposure of the entire message to the viewers between floors. Additionally, managing the ads to reflect and exploit the demographic tendencies discussed previously is a more involved process than it might seem at first. Transmitting the ads to the video display screen within the elevator poses an obvious problem because the elevator is in near constant motion. Additionally, many advertisers would only be interested in a marketing channel that can be used to reach large numbers of potential customers. Although many millions of consumers ride elevators each day, it would take a large network of video-based ad displays to reach any significant number of those riders and, thereby, interest an advertiser that might be looking for regional or national coverage.

Additionally, advertisers often want some sort of verification that a particular ad has been displayed. If, because of a system or power failure, a particular ad is not played as often as it was scheduled to play, the advertiser will be entitled to a partial refund of the ad price, or credit toward a future ad. Verifying for the advertiser that a particular transient graphic image appeared on a computer screen at a particular time is impossible after-the-fact, thus some provision must be made to log—at the time the images are displayed—each ad that is played.

Managing the distribution and monitoring of ad information on a large-scale over a computer network poses certain problems which other inventors have yet to fully appreciate. While there have been some proposed solutions for displaying computer generated information within individual elevators, no one has really addressed the issue of how to manage—on a large scale—a number of disparate displays, each within an elevator that might have its own ridership demographics; nor have the prior art solutions addressed the problem of how to systematically distribute and control the display of a very large number of adds appearing in multiple elevators and buildings, which buildings might potentially be located anywhere within the nation or elsewhere. Finally, no one has considered how the computer hardware—upon which a large-scale computer-based ad distribution network depends—might be monitored for failures and how those failures might be brought to the attention of the network operators.

What is needed, then, is a method and apparatus for controlling on a large scale the distribution and control of advertisements and other short messages in elevators, wherein the messages are preferably displayed on a computer monitor or similar display device within the elevators. The system should offer the ability to target specific elevators within a building or groups of elevators in the same or different buildings. It should also offer the capability of varying the type of ad as a function of the time of day, the day of the week, or day of the year for an individual elevator or for an entire network of elevators. Further, the system should be modular and amenable to a staged growth, allowing the system to be easily increased in size as the number of elevators involved increases. Additionally, it should also provide some means of verifying that an ad has actually been played on a display device at a particular time in a particular elevator. Finally, the network should be self-monitoring and capable of reporting to a central site any hardware or software problems that develop on a remote unit.

A patent search was conducted in the United States Patent and Trademark Office for the purpose of determining whether any similar or related solutions had been previously developed to the foregoing problems. That patent search produced the following references relating to advertising within elevators and methods of distributing short messages such as ads:

an elevator or other consumer gathering place. Patents of this sort include Fujiwara et al., U.S. Pat. No. 4,995,479, (display of elevator operating data), Tsuji et al., U.S. Pat. No. 4,749,062, (display of time sensitive greetings and weather reports to car occupants), Marubashi, U.S. Pat. No. 4,577,177, (laser display of information written on the inside of closed elevator door), Tsuji et al., U.S. Pat. No. 5,056,629 (display of informational messages and time to car occupants), and Bishop, Jr. et al., U.S. Pat. No. 4,853,678 (advertising device incorporating a passive infra-red sensing system as a trigger). None of these patents appreciates or addresses the problem of transporting, scheduling, and displaying targeted graphics and text-based advertising in a multiplicity of elevator locations.

Doigan et al., U.S. Pat. No. 5,606,154, discloses a method of displaying short messages to elevator occupants, wherein the message is selected based on the estimated elevator run time until the next stop, the message selected preferably being shorter in duration than the estimated time until the next elevator stop. This approach tends to insure that the car occupants are prepared to exit the elevator when the doors open, rather than remaining on the elevator to see whatever remains of the message that is currently being displayed. Doigan et al. is not concerned with the distribution of messages and remote control of their display, nor does this patent deal with the problem controlling a multiplicity of elevator displays and coordinating the display of ads from a centralized remote location.

Turning now to non-elevator advertising, Fisher et al., U.S. Pat. No. 5,392,066, discloses an in-store advertising system which features multiple display devices at the same location that all present the same image simultaneously. Fisher et al. does not address the problem of separately

| U.S. Pat. No. | Inventor | Title | Date of Patent |
|---|---|---|---|
| 4,577,177 | Marubashi | Display Apparatus for Elevator Car | Mar. 18, 1986 |
| 4,749,062 | Tsuji et al. | Display Control Apparatus for Elevator | Jun. 7, 1988 |
| 4,853,678 | Bishop, Jr. et al. | Advertising Device | Aug. 1, 1989 |
| 4,995,479 | Fujiwara et al. | Display Guide Apparatus of Elevator and Its Display Method | Feb. 26, 1991 |
| 5,056,629 | Tsuji et al. | Display Apparatus for Elevator | Oct. 15, 1991 |
| 5,360,952 | Brajczewski, et al. | Local Area Network Elevator Communications Network | Nov. 1, 1994 |
| 5,387,769 | Kupersmith, et al. | Local Area Network Between an Elevator System Building Controller, Group Controller and Car Controller, using Redundant Communication Links | Feb. 7, 1995 |
| 5,392,006 | Fisher, et al. | In-store Advertising System | Feb. 21, 1995 |
| 5,606,154 | Doigan et al. | Timed Advertising in Elevators and Other Shuttles | Feb. 25, 1997 |
| 5,642,484 | Harrison, III, et al. | Pump Top Advertisement Distribution and Display System with Performance and Sales Information Feedback | June 24, 1997 |

Some of the patents listed above relate to controlling the operations of an elevator or bank of elevators (responding to rider requests, etc.) rather than managing the distribution of ads in a group of elevators that might be scattered across a city or the nation. For example, Kupersmith, et al., U.S. Pat. No. 5,387,769, discloses a network for controlling elevator operations through a system of redundant communication links. However, Kupersmith does not consider the problem of routing and displaying short messages within an elevator. Brajczewski, U.S. Pat. No. 5,360,952, teaches a system for controlling elevator car movement through a local area network, which network is also redundant in some respects. Once again, this patent does not address the unique problems associated with the distribution of ads to elevators over a network.

Other inventors have considered the hardware that might be utilized to display video messages within, or adjacent to, controlling a plurality of monitors at the same location, nor does his invention address the special problems of advertising in elevators. Additionally, Fisher et al. does not recognize nor address the particular problems that arise when large digital ads are transmitted over a network for remote display.

Finally, Harrison et al., U.S. Pat. No. 5,642,484, considers an advertisement distribution and display system which utilizes information from an environmental sensor to guide selection of a particular message from among a plurality of message files. However, Harrison's invention does not consider the particular problems associated with management and distribution of large numbers of short ads via a network, Additionally, Harrison's invention does not offer any sort of self-diagnosis for the reporting of hardware and software problems.

Before proceeding to a description of the instant invention, however, it should be noted and remembered that the description of the invention which follows, together with the accompanying drawings, should not be construed as limiting the invention to the examples (or preferred embodiments) shown and described. This is so because those skilled in the art to which the invention pertains will be able to devise other forms of this invention within the ambit of the appended claims.

SUMMARY OF THE INVENTION

The invention disclosed herein pertains generally to a method and apparatus for controlling the distribution and display of advertisements and other short messages via a network. It applies more particularly to a means for displaying advertisements to passengers in elevators and similar conveyances, wherein the ultimate source of the messages is remote to the elevator and the messages are conveyed thereto over a network. Additionally, it pertains to a system for distributing ads to remote locations for display and retrieving information back from the remote locations relative to the ads displayed. It also pertains to a self-monitoring ad distribution network, wherein equipment failures are automatically reported to a central site.

According to a first aspect of the present invention there is provided a method for the distribution of short messages such as advertisements from a central server to a collection of remote sites such as elevator cars, wherein dynamic control of the messages and the order and timing of their presentation is maintained from a central location. In the preferred embodiment, a single central computer server (the "main control unit") functions as the principal controller for the entire system. It is by means of this unit that ads are entered into the system, scheduled for remote display, and routed over a network to the appropriate elevator display unit.

The ads might come from many sources, but it is envisioned that they would normally be received from an ad agency or developed in house by the fin that operates the ad distribution network. An ad might consist of any combination of text, audio, static graphics, and motion graphics—in brief, an ad might consist of any information that is expressible in digital form and appropriate for display on a computer monitor.

Along with the ad content, an advertiser will need to specify which elevators are to display the ad and the frequency with which the ad is to be presented to the riders. The advertiser might take into consideration any number of factors in specifying the conditions under which the ad is to be displayed including, but not limited to, the particular building in which an elevator is housed, the region of the country, the time of day, the day of the week, the day of the year, etc. The particular play parameters specified by the advertiser with regards to display locations and timing of an ad are converted to digital control information by an algorithm to be discussed hereinafter.

Remote to the main control unit are preferably one or more intermediate control units, which are connected to the central unit by way of a computer network which might consist of some combination of conventional telephone lines and the Internet. The function of an intermediate control unit is to act as a regional center for the receipt and distribution of digital ad files. In more particular, in the preferred embodiment there is one intermediate control unit per local calling area, which unit would act as a regional "warehouse" for ad data, receiving ads and control information from the main control unit and redistributing the ads to multiple sites in the same area. Thus, an ad that is to be displayed in 100 elevators within a given region would need to be transmitted only a single time to an intermediate control unit in that region, along with control information that directs the ad to those 100 specific sites. The intermediate control unit would then retransmit the ad—this time via a local call if telephone connections are used—to other still more local controllers, the "building control units," which in turn package and retransmit the information to the actual display sites. This scheme eliminates much of the communications surcharge that might otherwise be incurred in the transmission of the same information multiple times from the main control unit to the display units. This configuration also reduces the amount of time that the central server must spend sending data to a given remote display site, thereby freeing computer resources at the central location for other uses.

The local recipient of the ad data that has been transmitted to the intermediate controller is preferably a building control unit, although it might also be an individual display unit within an elevator. The function of the building control unit is analogous to that of the intermediate control unit and, as the name suggests, it acts as a building level warehouse of ad information for the individual display units, the graphics display units hereinafter, within a particular building. The building control unit has access to a communications network of some sort, which network allows the unit to establish a link between it and the intermediate control unit in its region. Ad data that is intended for numerous elevator display units in the same building can be transmitted a single time to a building control unit, from which it will thereafter be transmitted to each of the target display units within that building. This approach reduces the amount of time the intermediate display unit needs to devote to its retransmission function.

The ads that are resident on the main control unit are ultimately presented to the consumer via a graphic display unit that has been placed in an elevator within view of the passengers. Each graphic display unit might consist of, by way of example only, a video display unit and an associated networked CPU such as a PC or compatible computer. The display unit portion necessarily consists of some sort of video display device such as a conventional CRT, a LCD, or a plasma display unit. The unit would typically be mounted near the ceiling of the elevator and positioned in such a manner as to make it generally visible by the riders. Additionally, the display unit might be equipped with a speaker of some sort, thereby enabling the advertiser to reinforce its video message by introducing sound into the ad. In the text that follows, the terms "display unit" and "display device" will be taken to mean either a video display unit or a video display unit together with an audio speaker.

Each display device would preferably be connected to its own CPU, although this arrangement is not strictly necessary and multiple displays could easily be driven from a single CPU. The controlling CPU together with its attached display device (collectively the graphic display unit, hereinafter) would preferably both be mounted on the same elevator, which elevator is to be the recipient of the ad data. In the preferred embodiment, the CPU portion of the elevator display unit would be a PC or compatible equipped with a communications link and a hard disk. The hard disk is used to store digital ad data and control data for the associated video display. Each ad is displayed within a particular elevator according to a time schedule that was established when the ad was entered into the system.

According to a second aspect of the present invention, there is provided an ad distribution system for use in elevators substantially as described above, but containing additionally the capability of sending information back from the graphic display unit to the main control unit, which information might contain, by way of example, logs of ads actually displayed. In a preferred embodiment, the elevator CPU maintains a continuous log that records which ads have actually been played. This log is periodically transmitted back to the main control unit by way of the building and intermediate control units. Upon its receipt at the main control unit, the log is used to produce ad play statistics that are presented to the advertiser, thereby making it possible for the advertiser to verify that the ad has been presented to consumers with the frequency that was originally specified.

According to a third aspect of the present invention, there is provided an ad distribution system for use in elevators substantially as described above, but containing additionally the ability to detect and report failed computers and communications links in the network. In more particular, at regular intervals each computer in the system is queried by another to determine whether or not the queried computer is in a state appropriate for transmission and/or receipt of file information. When a computer is found to be nonresponsive, the network operator is notified and appropriate steps are taken to put that computer back on line.

The foregoing has outlined in broad terms the more important features of the invention disclosed herein so that the detailed description that follows may be more clearly understood, and so that the contribution of the instant inventor to the art may be better appreciated. The instant invention is not to be limited in its application to the details of the construction and to the arrangements of the components set forth in the following description or illustrated in the drawings. Rather, the invention is capable of other embodiments and of being practiced and carried out in various other ways not specifically enumerated herein. Finally, it should be understood that the phraseology and terminology employed herein are for the purpose of description and should not be regarded as limiting, unless the specification specifically so limits the invention.

BRIEF DESCRIPTION OF THE DRAWINGS

FIG. 3A contains a specific example of the components of a digital ad which is suitable for use with the instant invention.

FIG. 3B illustrates how the digital ad of FIG. 3A might be stored within the instant system.

FIGS. 4A and 4B contain an explanation of how ad play schedules are reduced to a numerical value.

FIG. 8 depicts some system level BCU 30 processes.

DETAILED DESCRIPTION OF THE PREFERRED EMBODIMENTS

Hardware

Figure 1:
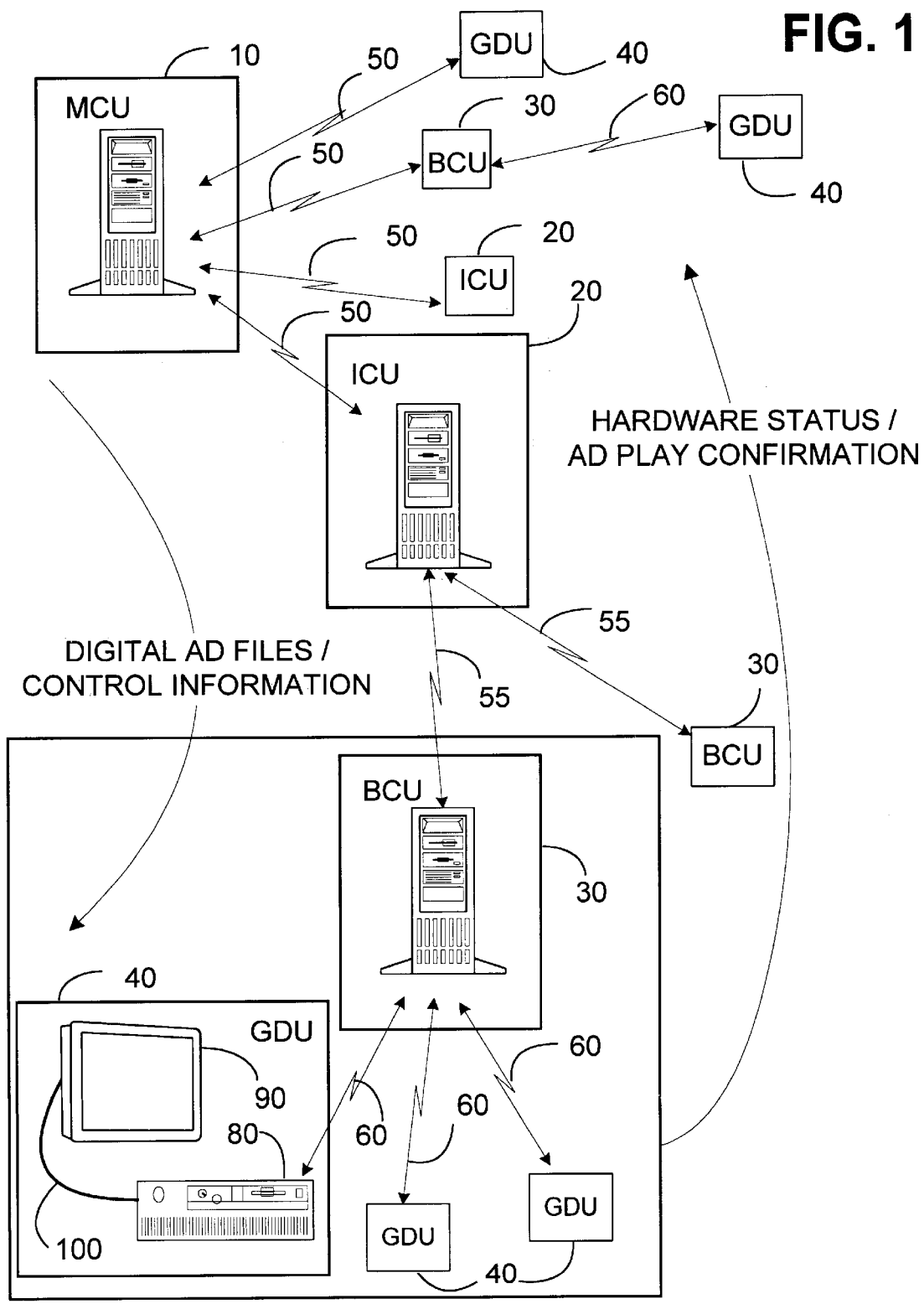
FIG. 1 is a schematic drawing that contains a broad overview of a preferred embodiment of the present invention.

Referring to the drawings in detail, wherein like numerals denote identical elements throughout the several views, there is shown in FIG. 1 a network-level overview of a preferred embodiment of the instant invention, wherein a main computing unit 10 ("MCU," hereinafter) acts as the center piece of a system designed to schedule and distribute advertisements though a network of interconnected computers to a group of display units mounted in elevators that might be located within a single building, distributed throughout a city, or scattered across the country. Broadly speaking, a principal function of the MCU 10 is to act as the main interface between the advertiser and the remote graphic display units 40 ("GDUs," hereinafter). Additionally, the MCU 10 acts as a central repository of digital ad data and client information. In practice, the MCU 10 might either be a single computer or, alternatively, a suite of computers networked together, the later configuration providing the additional hard disk storage and CPU power necessary to administer very large ad networks.

As is indicated generally in FIG. 1, the overall configuration of the system is that of a hierarchical topology of interconnected computers, wherein the MCU 10 resides at the apex of the hierarchy and preferably communicates with a suite of intermediate control units 20 ("ICUs," hereinafter) that, in turn, are in communication with one or more building control units 30 ("BCUs," hereinafter) which maintain communications links with the devices that actually present the ad data to the elevator riders, the GDUs 40.

The MCU 10 is preferably an Intel-based PC or compatible server that is configured to run the UNIX operating system. It could also be a computer workstation, a RISC based server, or a mini computer, but in the preferred embodiment it is a some sort of PC server. UNIX is a multiuser, multitasking operating system originally developed for use on minicomputers, but available today on almost any size computer, including PCs. It is preferred that the ICUs 20, BCUs 30, and GDUs 40 all run the UNIX operating system and it is anticipated that each will also be equipped with a windowing system, such as X-windows, which provides a graphic user interface. It should be noted that although the discussion that follows is couched exclusively in terms of the use of UNIX as a base operating system, those skilled in the art will recognize that it is possible to develop the same functionality using any modern computer operating system.

In the preferred embodiment, the MCU 10 is connected by way of network communications links 50 to one or more ICUs 20. An ICU 20 is designed to act as a regional warehouse for digital ad data, as it receives computer ad files from the MCU 10 and then retransmits copies of those files to buildings within its area that contain GDUs 40 that are scheduled to display a particular ad. In the preferred embodiment, there will be at least one ICU 20 within each local calling area that contains a GDU 40, so that the retransmission of the ad data will be over local phone lines, if telephone connections are used. Additionally, the instant inventors contemplate that, depending on the number of GDUs 40 in a particular area, it may be necessary in some cases to have multiple ICUs 20 within the same local calling area to handle the volume of ads that are passed therethrough.

The advantage of having the MCU 10 transmit to an ICU 20 rather than to each individual GDU 40 is that an ad that is to be displayed in multiple elevators within a given region would need to be transmitted only once to the ICU 20 for that region, along with control information that directs the ad to the specific display sites: the ICU 20 would then retransmit the ad data as directed by the control information. This configuration eliminates most of the telephone communications surcharges that might otherwise be incurred in the transmission of digital ad data from the MCU 10 to the display sites. Under present pricing models, if Internet connections between the MCU 10 and the ICU 20 are utilized rather than telephone lines, communications charges would not normally be an issue. However, this instant configuration offers an additional advantage in that it reduces the total amount of time that the MCU 10 must spend in communications related activities, thereby freeing computer resources at the central location for other uses.

Although the present inventors prefer that the MCU 10 communicate only with the ICUs 20, it should be clear to those skilled in the art that this arrangement is a convenience not a necessity, and that the MCU 10 might also communicate directly with a BCU 30 or even with one or more GDUs 40. However, in normal operation the MCU 10 will preferably communicate only with ICUs 20 or BCUs 30. The connection 50 between the MCU 10 and the ICU 20 might be connected by way of any conventional communications means including, by way of example, a dial-up modem, a dedicated data line, a satellite link, or other communications means, with price, bandwidth, and availability being three primary considerations in selecting the particular type of networking.

The BCU 30 is so-called because in the preferred embodiment there will be one such computer in each building containing elevators equipped with GDUs 40, although it is also possible that a BCU 30 might actually control the GDUs 40 in two or more buildings that are proximate to one another. In brief: the BCU 30 acts as a building-level controller and intermediary for all of the GDUs 40 within that building. A BCU 30 is in communication with the ICU 20 that is above it in the hierarchy via communications link 55 and to each of the GDUs 40 below it. It might be connected to its ICU 20 via a dial-up modem, a dedicated data line, a satellite link, or other communications means. However, it is anticipated that typically a BCU 30 will be connected to its GDUs 40 either via cable or via some sort of wire-less connection, although those skilled in the art will realize that there are many other interconnection means that might be used instead and that the precise means of interconnecting any two computers in the network is not important to the invention. Since the GDUs 40 are mounted on an elevator 70 (FIG. 2) and, therefore, constantly moving, the problems associated with connecting the GDUs 40 to the BCU 30 should not be taken lightly. Those skilled in the art will recognize that often there are spare conductors that are already connected to the elevator 70 that could be used as communications conduits. For example, elevators must have, at bare minimum, electrical service running to them and very often control lines as well, either of which might be utilized to make the BCU 30–GDUs 40 connection. Additionally, wireless communications between the computers is always a possibility, although perhaps a somewhat more expensive alternative than those suggested previously. Finally, if need be a separate communications cable (e.g., coax or twisted pair) could be run to each elevator that has a GDU 40.

Figure 2:
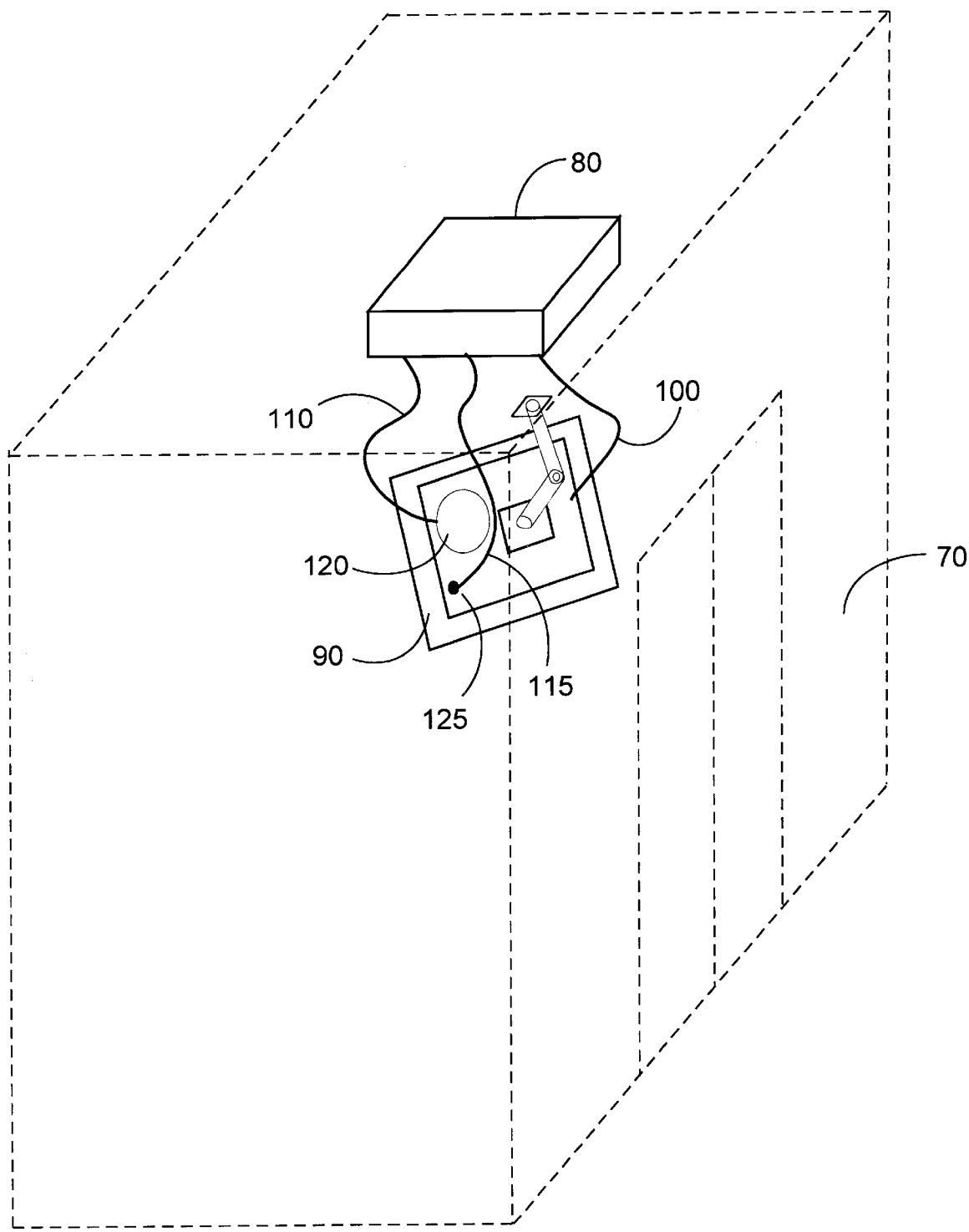
FIG. 2 illustrates how a GDU 40 might be installed in a conventional elevator.

Turning now to the GDU 40 hardware, a GDU 40 consists of (FIGS. 1 and 2) a graphical display device 90 together with a controlling CPU 80 and a video connection 100 therebetween. Although the GDU 40 has been pictured in FIGS. 1 and 2 as consisting of two separate devices, those skilled in the art know that it is possible to incorporate the CPU 80 and graphical display device 90 within a single unit. Additionally, there is a communications link 60 between the CPU 80 and the BCU 30, through which ad information is received from the BCU 30 and ad logs, discussed hereinafter, are returned. As is illustrated in FIG. 2, the GDU 40 is preferably mounted on the elevator 70 with its CPU 80 external to the car and its display device 90 within. Optionally, a speaker 120 might be installed inside of the elevator and would be connected to the CPU 80 by audio line 110. This would allow sound to be introduced into an ad.

The display unit 90 is preferably mounted within the elevator 70 near the door at a height that is above the head of the average person, thereby making it potentially visible to everyone on board. The display unit 90 might be a conventional computer monitor or, alternatively, a flat display that utilizes LCD or plasma technology. There are any number of methods by which the display unit 90 might be mounted inside of the elevator 70, but the preferred mounting method is to attach it to a mounting bracket which has been affixed to the elevator ceiling. Alternatively, the unit could be installed within a sealed recess in a wall of the elevator 70. In that case, it is anticipated that the mouth of the recess would be covered with a protective sheet of clear plastic or polymer such as that which is sold under the trademarks Plexiglas or Lexan. This would tend to reduce the risk of vandalism to and theft of the display unit 90.

The CPU 80 preferably consists of at least the following typical PC computer components: a system board; a video board containing an output that mates with one end of video link 100 (the other end of which link 100 terminates in display unit 90), a sound card that mates with one end of audio connector 110 (which connector 110 terminates in speaker 120), a network adapter, at least one I/O port, at least 32 megabytes of computer RAM, a hard drive, and a power supply. The CPU 80 is preferably mounted on the exterior of the elevator cab 70, although many other suitable locations are available. It is anticipated that the CPU 80 will preferably be enclosed within some sort of ruggedized housing, i.e., one that has been designed and built to operate in an industrial environment.

The various communications links (50, 55, and 60) that interconnect the computers in this network might be any combination of conventional communications means. By way of example, the communications protocol might be ethernet, token ring, satellite, VSAT, broadcast FM sideband during the vertical blanking interval, SONET, ATM frame relay, FDDI, wireless, spread spectrum, PCS, infrared laser, PTSN, ADSL, ISDN. The physical connections between the computers might be, for example, a serial connection, a parallel connection, USB ports, a dial-up modem, a coax cable, twisted pair, fiber optics, etc.

An optional piece of hardware associated with the instant invention is a GDU display monitor 125 which allows a GDU 40 to determine whether or not its display device 90 is operational. In more particular, in the preferred embodiment, an LCD panel will be used as a display device 90. Those skilled in the art know that an LCD panel has a constant-intensity internal light source and the device creates images on its front face by selectively reducing the amount of light available to the front of the display. The light source is typically a fluorescent tube with a typical mean time between failure of about 30,000 hours. However, failure of the fluorescent tube is still the most common cause of an LCD malfunction. It is important to know as soon as possible after a failure so that corrective action can be taken—no advertiser wants to pay for ads that fail to display because of equipment failure. The instant embodiment offers a way of sensing failure in the LCD display 90 by electronically measuring the amount of light coming from the fluorescent tube. If the amount of light produced by a tube falls below a certain predetermined level, the LCD will be classified as having "failed" and the MCU 10 will be notified accordingly. The level of light production by a fluorescent tube can easily be determined by placing a photoelectric device 125, e.g. photo diode or photo transistor, in close proximity to the fluorescent tube via an access port on the back of the LCD display. A connecting wire 115 between the display monitor 125 and an 1/0 port on the GDU 40 allows the GDU 40 to periodically monitor its display 90. The placement of this photoelectric device 125 on the back of the display 90 and hidden within the housing of the display allows for invisible monitoring of the display 90 operation.

Finally, in the previous text the disk drives have been discussed as though they were physically mounted inside each of the computers in the system, and that is certainly the preferred approach. However, those skilled in the art will recognize that a hard disk need not be physically present inside of a computer, but it could instead be a "logical" drive which is located somewhere else in the network Additionally, if sufficient RAM is present, a RAM disk or similar arrangement can be used to create a volatile disk drive within memory. Thus, when a disk drive is called for hereinafter, that term will be taken to mean any data storage means that can be either accessed directly (on board hard disk, floppy disk, ZIP disk, RAM disk, etc.) or reached indirectly through software such as NFS, Novell, Banyon, etc.

MCU Data Files

FIG. 3A contains a specific example of the sort of information and files that would be sufficient to define an ad for use with the instant invention. The ad itself consists broadly of two sorts of information: the graphic and/or text images 150 that will be displayed on an elevator display unit 90 and a play instruction file 140 that contains computer instructions for displaying the ad. Note that in FIG. 3A, the visual portion of this ad consists of two graphic images 150 and these two images are kept in separate computer files "IMG1.JPG" and "IM2.JPG." Alternatively, the visual portion of the ad might consist of simple text messages that are printed to the display unit 90. However, for purposes of illustration in the text that follows, the ad will be discussed as through it consists only of graphic images.

The example play instructions 140 are not written in any particular computer language, but rather are merely descriptive of the steps that a display program might be programmed to execute. In the preferred embodiment, the HTML programming language—HTML being a device independent language that has been widely adopted for use throughout the Internet—would be used to control the ad play, but that is a convenience not a necessity, and those skilled in the art will understand how any conventional computer language could be used to accomplish the necessary steps. Additionally, JAVA, an emerging interpreted standard programming language for use over the Internet, might also be used to control the ad display. By way of explanation, the "READ" command in FIG. 3A retrieves the graphics file 150 named thereafter from disk, and the "DISPLAY" command causes the graphics file 150 to be made visible on display unit 90.

Graphics files 150 appropriate for use within the instant system consists of static and/or dynamic images stored in digital format and suitable for presentation on a computer monitor. The exact format of the ads is not important for purposes of the instant invention, however it is anticipated that the images will conform to some sort of graphic standard. A preferred digital format for the static images is an industry standard such as GIF or JPEG, whereas dynamic (or motion video) would preferably be stored as MPEG, AVI, or animated GIF data files. All of these digital image formats are well-known to those skilled in the art and it is immaterial to the instant invention which format is actually used. Additionally, the instant inventors contemplate that, rather than using graphics files 150, the play instruction file 140 might simply contain a textual message that is sent to the display unit 90, in which case no graphics files 150 would be required.

As should be clear in FIG. 3A, the play instructions 140 call for the two graphic files 150 to be sequentially read and each displayed for a period of five seconds. The last step in the play instructions file is to clean the screen of the second image in preparation for the presentation of the next ad in the sequence.

In the preferred embodiment, all three files (the play instructions 140 and the two graphic images 150) are stored on the hard disk of the MCU 10 as a single compressed data file, the digital ad file 130 "AD_DATA.ZIP" of FIG. 3A. Although the file name "AD_DATA.ZIP" in FIG. 3A suggests that the "PKZIP" computer program has been used to combine the multiple files associated with a given ad into a single file, those skilled in the art will understand that many other programs might have been used instead. (PKZIP is a computer program that is well-known to those in the IBM compatible personal computer arts.) The combination of the separate files into a single digital ad file 130 is preferably done at the time the files are entered into the system and is done primarily for purposes of convenience in the steps that follow.

Play schedule 160 specifies the starting and ending dates of an ad's display, as well as the times during the day that it is to be played. As is indicated in FIG. 3A, in the preferred embodiment an advertiser will specify 1-hour intervals during which time the ad is to play, an "X" within the example play schedule 160 indicating that a particular play time has been selected by the advertiser. It is important for purposes of the discussion that follows to note that there are three play "patterns" illustrated in the example of FIG. 3A: one that applies Monday, Wednesday, and Friday; a different pattern on Saturday; and a third play pattern on Sunday.

The advertiser must also specify the elevators in which the ad is to appear: the ad play locations. In the example of FIG. 3A, the ad is scheduled to play in Tulsa, Okla. in the Beacon Building in all elevators. The ICU number 250, ICU #1 in this case, corresponds to a regional server in Tulsa, Okla. Similarly, the BCU number 260, BCU #3 in this case, is a unique number that is assigned to this particular building. It is necessary for purposes of this example that BCU #3 (the Beacon Building) be within the region served by ICU #1 (Tulsa, Okla.). Thus, as will be discussed later, the ICU/BCU/GDU combination describes not only a destination, but also the path that data will take in moving from the MCU 10 to the designated displays. Finally, note that in FIG. 3A the GDU number 270 has been set to zero, a convention that is used within the instant system to signify that the ad is to play in all elevators in the designated building, BCU #3 in this case. If the value of the GDU number 270 had been non-zero, that value would have indicated that the ad was to be played in only a single elevator within the building BCU #3. Multiple records, each with a different specific GDU number 270, would be used to specify an ad play scheme that involved a collection of individual elevators. Similarly, if the value of the BCU number 260 had been equal to zero, that value would have indicated that the ad was to be played in every elevator within the scope of ICU #1—every elevator in every building served by ICU #1.

The disk drives of the MCU 10 are a repository for a master database 180 (FIG. 3B) that contains all of the ad and scheduling information for the entire system. Among the sorts of information that are preferably kept within this database 180 are items such as the display parameters for each active ad in the system, pointers to support files for each ad, and information relating to the structure of the network.

By way of example—and carrying forward with the illustration begun in FIG. 3A—in FIG. 3B three exemplary database records 190 are illustrated that correspond to the three play patterns 160 of FIG. 3A. Display parameters for an ad such as would be appropriate for storage within database 180 might include information such as a unique ad identification number 290, ad start 274 and stop 278 dates, elevator locations where the ad is to be played (250, 260, and 270), the frequency of the display 160, the time period during the day when the ad is to be played 240, and the length of each ad. Note, however, that the records illustrated in FIG. 3B should be taken only as broadly representative of the sorts of information that might be associated with a digital ad and stored in the master database 180.

In the preferred embodiment and as is illustrated in FIG. 3B, each ad is given a unique ad identification number 290 and assigned an ad category 220 when it is entered into the system. The category 220 will indicate in a broad way the subject matter of the ad and might be, for example, an integer that signals whether the ad is for a coffee shop, a restaurant, or a travel agency, etc. The purpose of the category 220 field is to provide some method of, in so far as it is possible, preventing two ads for similar products from running sequentially.

A third preferred field in a database record associated with an ad is an entry that points to the file that contains the digital ad data 130 for that ad. As was explained previously, all of the files associated with an ad are preferably combined into a single composite "ZMP" (or "tar", etc.) file for ease in handling: the digital ad file 130. The database field 230 contains the name of this file: "AD_DATA.ZIP."

Another preferred field in the database record for an ad is a digital representation of the play schedule 160. FIGS. 4A and 4B illustrate a compact and preferred method by which the scheduled play times and days of the week can be represented as integer values suitable for storing within the master database 180. First with respect to FIG. 4A, note that if each hour wherein an ad is to play is represented as a "1" and each hour in which an ad does not play is represented by a "0", a 24-bit binary value is created whose numerical value will be representative of the play schedule. Similarly, as illustrated in FIG. 4B, a binary integer may be constructed from the 7 "bits" that represent the seven different days of the week. These numerical values may be readily stored in the play schedule 240 field within the master database.

In the preferred embodiment, if an ad is to be run during a particular hour, it will be made part of a suite of ads that are all scheduled to run that same hour and the entire suite will be displayed repeatedly until the next hour arrives, whereupon a (possibly) new suite of ads will be selected and played. Said another way, the number of times a particular ad will play in an hour is dependent on how many other ads are scheduled to run during that hour: the entire suite of ads preferably being repeated during an hour as many times as possible. That being said, the instant inventors contemplate that some amount of time each hour may be held back for display of information of general interest, including the current time, weather and temperature data, news highlights, reports of stock market activity, etc. Additionally, those skilled in the art will understand that there are any number of other ways to vary the ad play schedule and to control the play of the ads.

Database fields 250, 260, and 270 contain integers that specify not only which GDUs 40 are to host a particular ad, but also the sequence of computers that should handle the transmission of the data from the MCU 10 to its ultimate destination. In FIG. 3B and as has been discussed previously, the particular combination of ICU identification number 250, BCU identification number 260, and GDU identification number 270 values in the example database record indicates that the ad is to play in every elevator in the Beacon Building in Tulsa, Okla. (ICU #1, BCU #3, and GDU #0). These values also indicate, as discussed below, that the digital ad data may be most efficiently moved from the MCU 10 to the GDUs 40 by first transmitting it to ICU #1, then to BCU #3, and finally to each GDU 40 in the building. Needless to say, although the instant invention has been illustrated as using identification numbers, any sort of identification code—numeric or not—could be used instead.

Database field 285 is designed to hold the date on which the corresponding digital ad file 130 was transmitted over the network for remote display. Where the sent date 285 is "0001-01-01" as it is in FIG. 3B, that value indicates that an ad has not yet been transmitted. After transmission, that field 285 will be changed to reflect the actual year, month, and day the information was sent. This field allows the MCU transfer program 300 to quickly identify (for transmission and other purposes) new ads in the database.

Finally, database field 280 provides a means for the operator of the ad network to cancel an ad and prevent it from running its full course. If the "NO" parameter in database field 280 is changed to a "YES," that will act as a signal that the ad corresponding to that record is to be terminated on ICU/BCU/GDU combination specified. More will be said in connection with this feature below.

The foregoing has listed some of the many useful ad parameters that might be kept in a central database 180 such as that described above. Those skilled in the art will recognize that a variety of other items of information might also be included. However, the items discussed above are broadly illustrative of the sorts of information that the instant inventors contemplate including within the system.

The MCU 10 exercises control over the GDUs 40 by way of a variety of command files that are transmitted over the network to the remote computers where they are interpreted and executed. As is illustrated in FIG. 3B, one such file is an additions file 200, which file contains a listing of new ads that are to be added into the system. The additions file 200 contains a separate record for each new ad, with multiple records being necessary in the illustrated case to accommodate the fact that there are three different play patterns, each play pattern being considered as a separate ad.

Another control file that is important to the instant invention is a cancellations file 210, said cancellations file 210 containing records that signal to the remote units that the run of particular ads (as identified by their ad numbers 290) are to be immediately terminated. In the normal course of events, each ad is associated with a particular start and stop date, and the stop date will act to automatically terminate the display of an ad. However, in some cases it might be necessary to terminate the run of an ad before its scheduled end date. The cancellations file 210 provides a means to do this.

All of the files mentioned previously originate on the MCU 10 and remain there until they are later transferred via the network to remote units. However, there are other files within the system that originate elsewhere and are transferred back to the MCU 10 for use there. By way of example, an ad log file is created on each GDU 40. The purpose of this file is to provide a historical record of the ads that have actually been played on the computer monitor in that elevator. Advertisers will want this sort of play confirmation and they will also want to know the actual number of times an ad has been played. A log file can provide verification of that sort. The log files are periodically collected from each GDU 40 as discussed below and transmitted back to the MCU 10 for presentation to the advertiser.

File Transfers

Figure 5:
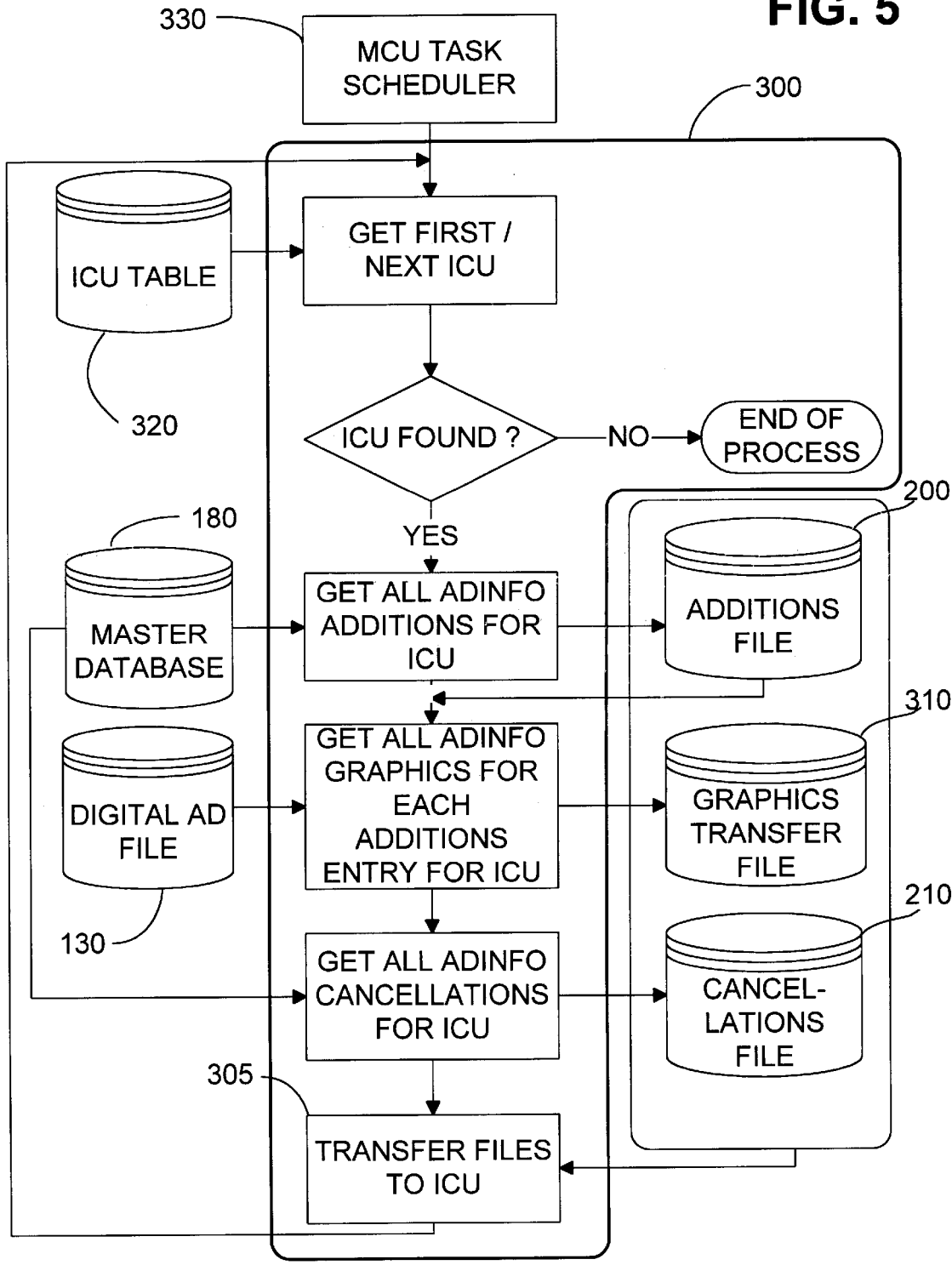
FIG. 5 is a schematic illustration of how digital ad files are processed by the MCU 10 for transfer to an ICU 20.

As is generally illustrated in FIGS. 3B and 5, in the normal sequence of events an ad is placed into the system through the MCU 10 and its display parameters are encoded and made a part of the master database 180. In the preferred embodiment, a task scheduler 330 periodically initiates the MCU transfer program 300 which begins by determining which ads in the master database 180 are "new" and have not yet been transmitted outward for remote display. The MCU transfer program 300 searches through the database—one ICU number at a time—and extracts all of the records representing new ads that are destined for a particular ICU 20. By way of example, in FIG. 3B there are three new ads that are to be shipped to ICU #1. Information corresponding to those ads is extracted from the master database 180 and incorporated into an additions file 200, one record being created for each new ad. Additionally, the MCU transfer program 300 collects all of the digital ad files 130 named in any digital ad file field 230 of a record and combines those files into a single graphics transfer file 310, a preferred way of combining these files being through the use of the UNIX "tar" utility. In the example of FIG. 3B, only a single digital ad file 130 ("AD_DATA.ZP") needs to be transferred to satisfy the graphical requirements of all three ads and the MCU transfer program 300 is designed to recognize and exploit this fact.

The cancellations file 210 in FIG. 3B is shown as being empty. However, if any records within the master database 180 had been flagged as canceled (e.g., by having their cancel parameter 280 set to "YES") the MCU transfer program 300 would note that fact during its search of the database and extract the information corresponding to that record/ad for inclusion in the cancellations file 210. There would be one record in the cancellations file 210 for each ad that is to be canceled via ICU #1 in FIG. 3B.

As is illustrated in FIG. 5, the task scheduler 330 is a computer program that runs periodically on the MCU 10 and initiates the running of other programs such as the MCU transfer program 300. Note that the instant inventors specifically contemplate that the MCU transfer program 300 might also be manually initiated to accommodate those situations where some modification to the remote display sites is to be made immediately, rather than at the next scheduled run. Additionally, note that ICU table 320 contains a system map, wherein the topology of the network is specified and includes such items as a listing of each ICU 20 in the network as well as all of the BCUs 30 and GDUs 40 that depend from each ICU 20. It additionally contains the BCU 30–GDU 40 dependencies. Methods of constructing and maintaining such a table are well-known to those skilled in the art.

As a last step, the MCU 10 contacts each ICU 20 that has files destined for transfer to it. In the preferred embodiment, that contact and subsequent transfer will be made via "ftp" (i.e., "file transfer protocol"), ftp being well-known to those skilled in the art as a communications program suitable for transferring text and binary data files between computers over a network. In FIG. 5, the transfer step 305 is preferably via ftp. In the preferred embodiment, the additions file 200, graphics transfer file 310 and cancellations file 210 would have been combined into a single file (zipped) before transfer, but, for purposes of clarity, the discussion that follows will assume that each file is separately transferred.

On the destination ICU 20 (ICU #1 in the example), the files are received into a specific subdirectory set aside for that purpose. After the file transfer has completed, the transfer program running on the MCU 10 initiates a script (ICU transfer program 340 in FIG. 6) which runs on the destination ICU 20 and prepares the transferred files for a next transfer to one or more BCUs 30 within the region served by that ICU 20. The ICU transfer program 340 acts with respect to the BCUs 30 within its region in the same fashion as the MCU transfer program 300 acts with respect to the ICUs 20. In more particular, the ICU transfer program 340 extracts the information designated for each BCU 30 in its region and then sends only that information to the BCU 30.

Figure 6:
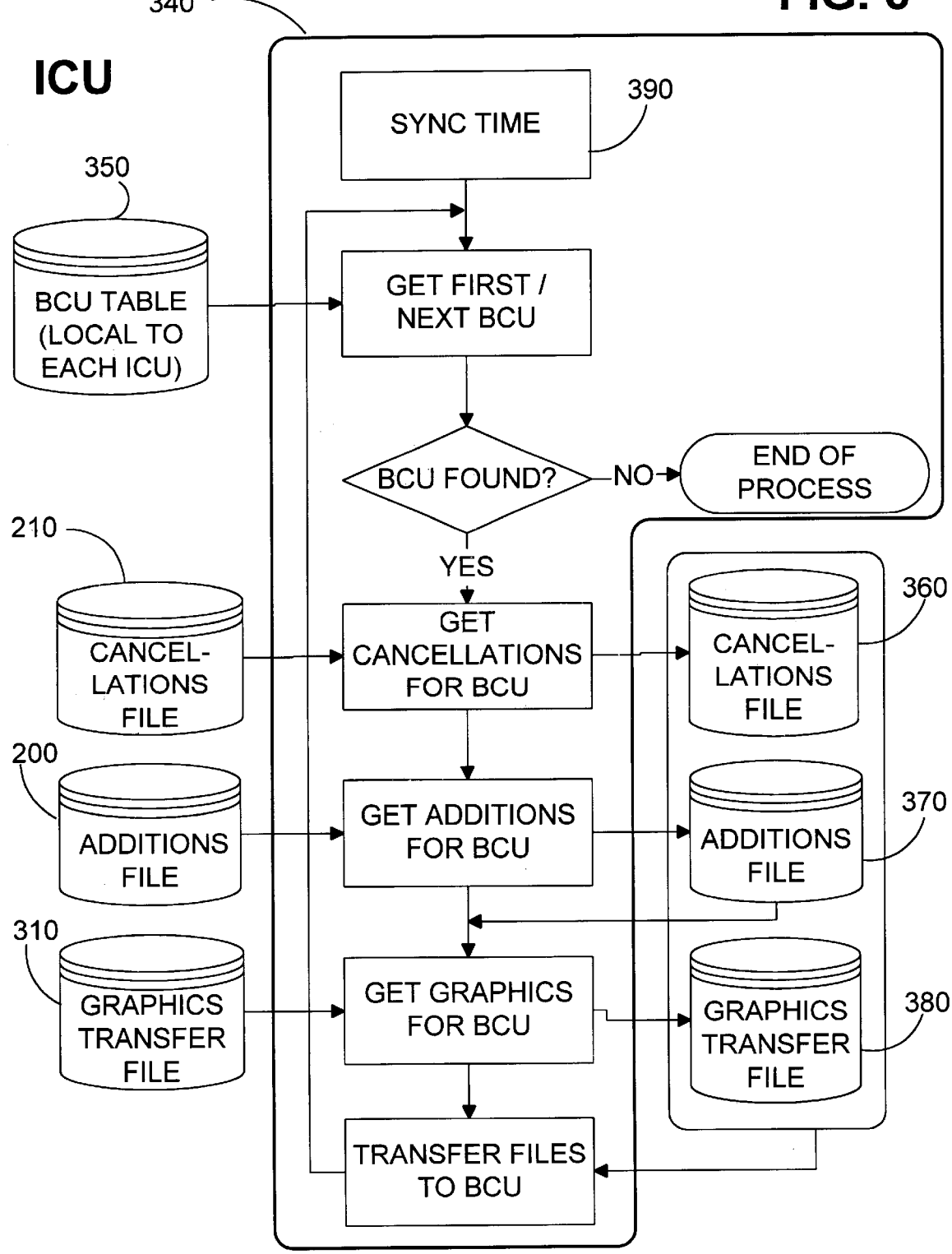
FIG. 6 illustrates how digital ad files are further processed by an ICU 20 for transmission to a BCU 30.

As is illustrated in FIG. 6, a BCU table 350 is resident on each ICU 20, which table maps the network topology below that ICU 20. This table 350 provides the ICU 20 with the information that it needs to forward the ad files to the appropriate BCUs 30 within its region. The means by which such tables are constructed and maintained are well-known to those skilled in the art and need not be discussed here.

The ICU transfer program 340 examines the records in the additions file 200, a copy of which now resides on its own hard disk. In the same way that the MCU transfer program 300 on the MCU 10 created separate additions files 200, cancellation files 210 and graphics transfer files 310 for each ICU 20, the ICU transfer program 340 creates separate transfer files for each BCU 30 that has been designated to receive ad data. Continuing with the example of FIG. 3A, the additions file 200 together with its associated graphics transfer file 310 would be prepared for transmission to BCU #3. Note that, if the BCU number 260 for a particular ad record had been zero, that would have been a signal to the receiving ICU 20 that the ad was to be transmitted to every BCU 30 within its region. Needless to say, it will often be the case that the additions file 200 will contain ad records with different BCU numbers 260 and in that case multiple additions files 200 will be created—one for each unique BCU number 260 in the received additions file 200. Additionally, if the BCU number 260 had been zero, one additions file would have been created for each BCU 30 attached to the ICU 20. The cancellations file 210 is treated similarly.

As a next step, the ICU 20 contacts each BCU 30 within its region for which it has received a new ad or cancellation. Once again, only files corresponding to a particular BCU number 260 are transferred to the corresponding BCU 30. The ICU 20 contacts each BCU 30 in turn, preferably using ftp, and transfers the additions 370, cancellations 360, and graphics 380 transfer files (FIG. 6) and, before severing the connection, initiates a script 410 in FIG. 7 that causes the BCU 30 to further process the digital ad data and send it on to its ultimate destination (a GDU 40).

Figure 7:
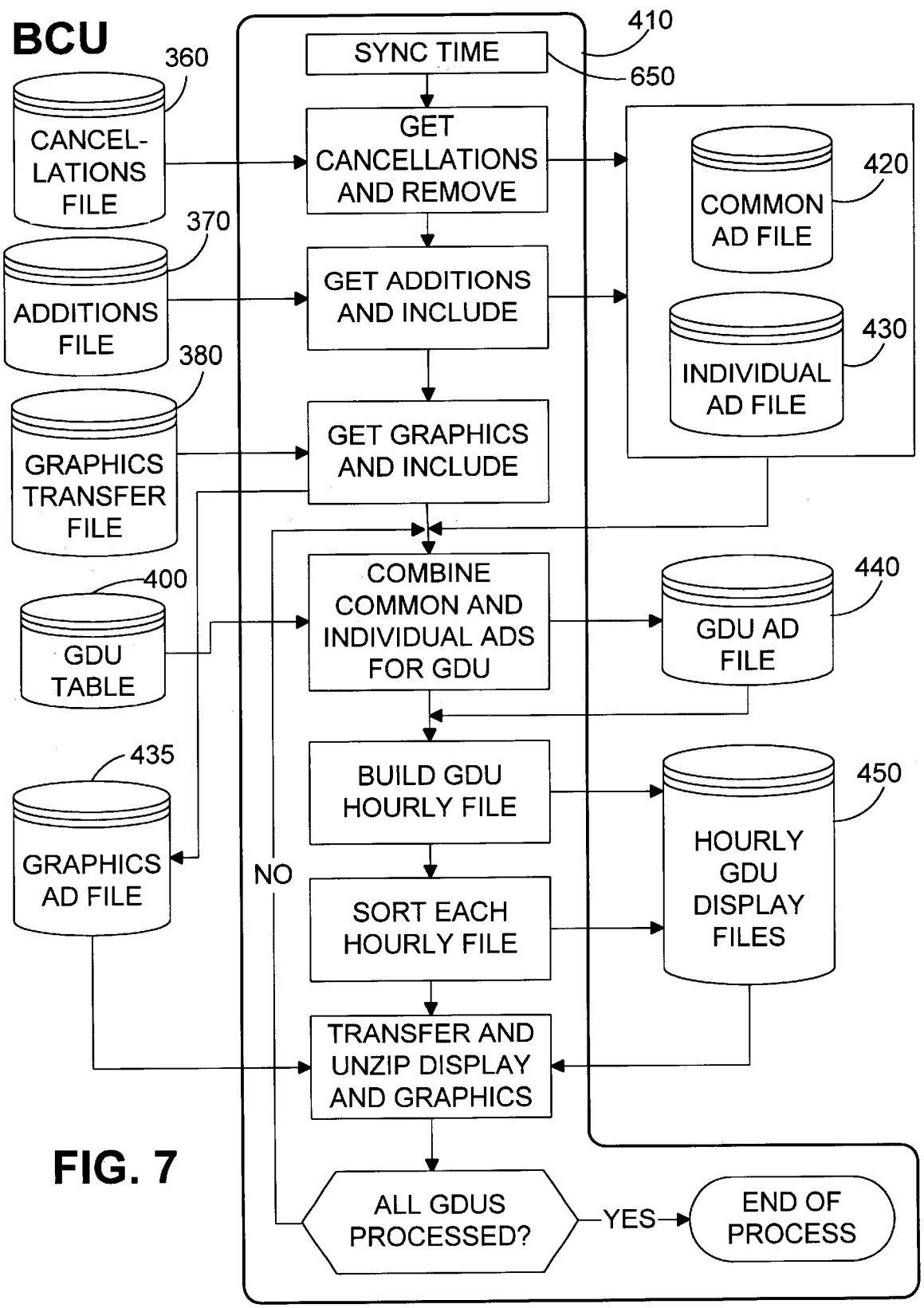
FIG. 7 is a schematic illustration of how digital ad files are further processed by a BCU 30 for transmission to a GDU 40.

At this point in the ad transmission scheme, the BCU 30 now is the repository of digital ad data that are destined for display on one or more GDUs 40 connected thereto. Turning now to FIG. 7 wherein the operations relating to file transfer from a BCU 30 to a GDU 40 are illustrated in some detail, the ICU 20— as part of the final step of file transfer program 340—initiates a BCU transfer program 410, the function of which is to prepare the digital ad data for further movement to the GDUs 40 where it will be displayed. In the preferred embodiment, the BCU transfer program 410 processes the files received from the ICU 20 into two BCU database files: a common database file 420, which contains ads that run on every attached GDU 40, and individual database files 430, that contain ad data that is not to be shared by every GDU 40. There may be a multiplicity of individual ad database files 430, potentially as many as there are GDUs 40 attached to this BCU 30. The individual 430 and common 420 ad databases maintain the current ad records for all of the GDUs 40 that depend from this BCU 30. These ad databases contain data that are a subset of the information in the MCU master database 180. That is, the common 420 and individual 430 databases would typically contain only information that is strictly related to play of a digital ad (e.g., ad records 190), whereas the master database 180 might contain additional information such as client billing and contact information, as well as historical information pertaining to ads previously played for this client, etc.

Cancellation requests arriving in the BCU cancellation file 360 are preferably applied to the individual 430 and common 420 ad databases, rather than transmitting the cancellation records further to the individual GDUs 40. The BCU transfer program 410 examines each record in the BCU cancellation file 360 and deletes the corresponding ad entry from the appropriate ad database: if the GDU number 270 is zero, the corresponding ad is removed from the common ad database 420, as this cancellation applies to all GDUs 40. On the other hand, if the GDU number 270 is nonzero that ad will be removed only from the individual ad database 430 corresponding to that single GDU 40. Finally, cancellation file processing also removes dated ads from the ad database after their stop dates 278 have passed.

Digital ads in the BCU additions file 370 are added by the BCU transfer program 410 to the individual 430 and common 420 ad databases depending on the GDU number 270 of each ad, with an ads having a GDU number 270 equal to zero being added to the common ad database 420.

Figure 12:
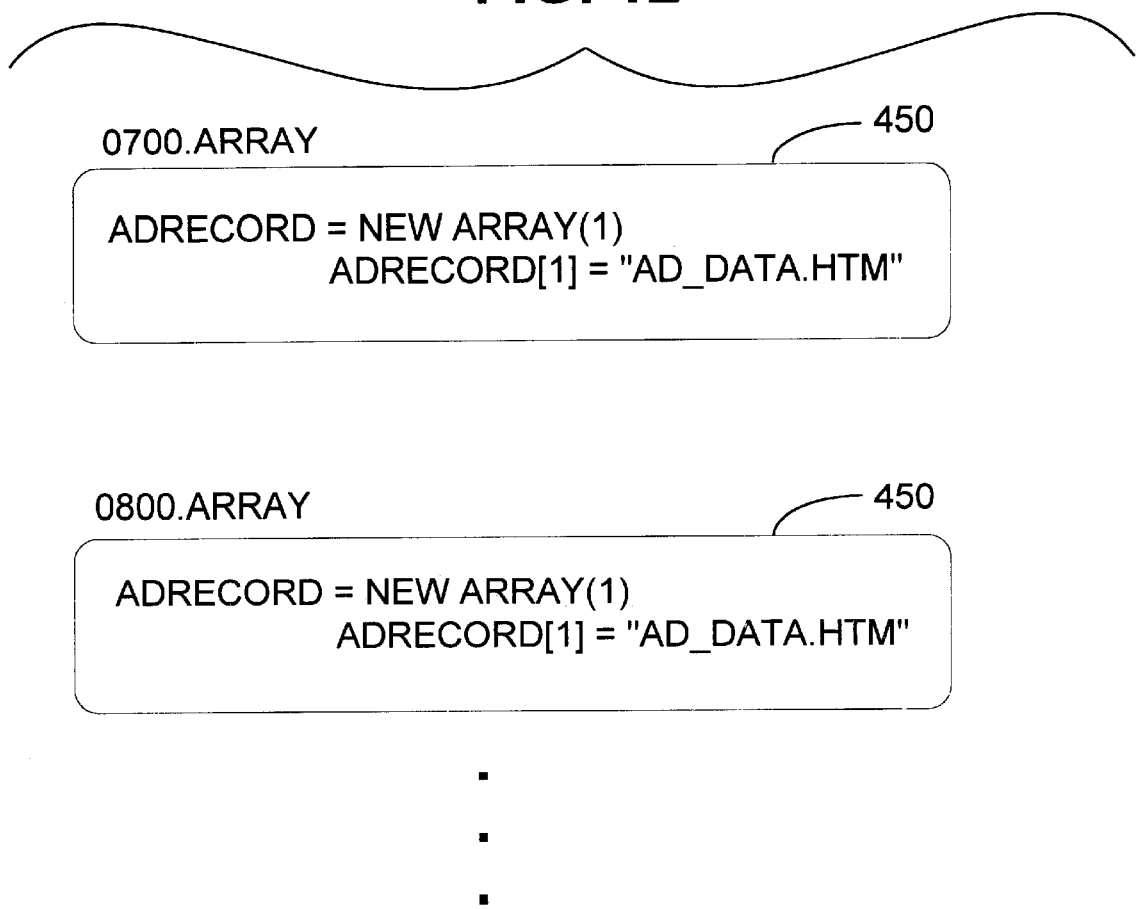
FIG. 12 contains a schematic illustration of the contents of two typical hourly display files 450.

As a next step, the BCU transfer program 410 prepares the ad files for their final trip to a designated GDU 40. Beginning with a first GDU 40, the program extracts all of the ad records corresponding to that GDU 40 and builds a temporary GDU ad database 440 (FIG. 7) which contains records from the common 420 and individual 430 ad files. This database 440 contains all of the ads that are currently scheduled to run on this GDU 40—ads received in the latest transmission as well as ads sent previously and that have not yet reached their stop dates 278—and might even contain ads that are scheduled to run in the future (i.e., ads with starting dates 247 in the future). From the temporary GDU ad database 440, the program builds 24 hourly display files 450, each hourly display file 450 (FIGS. 7 and 12) containing a listing of the ads that are to be run during a particular hour of the day. FIG. 12 contains two examples of hourly display files 450: one file contains the play instructions for the hour following 7:00 a.m. and another for the hour following 8:00 a.m. If additional ads had been scheduled to be run within an hour (i.e., beyond the single ad of the instant example), additional "HTM" files would have been listed and stored consecutively in ADRECORD[2], ADRECORD[3], etc., as needed.

As a final step before transfer, the BCU transfer program 410 organizes the ad records within each hourly display file 450 so that ads from advertisers of the same type will not be played one right after another within that hour. The BCU transfer program 410 then sends the hourly display files 450, along with their supporting graphics and command files as contained in the BCU graphics transfer file 435, to the GDU 40.

Figure 9A:
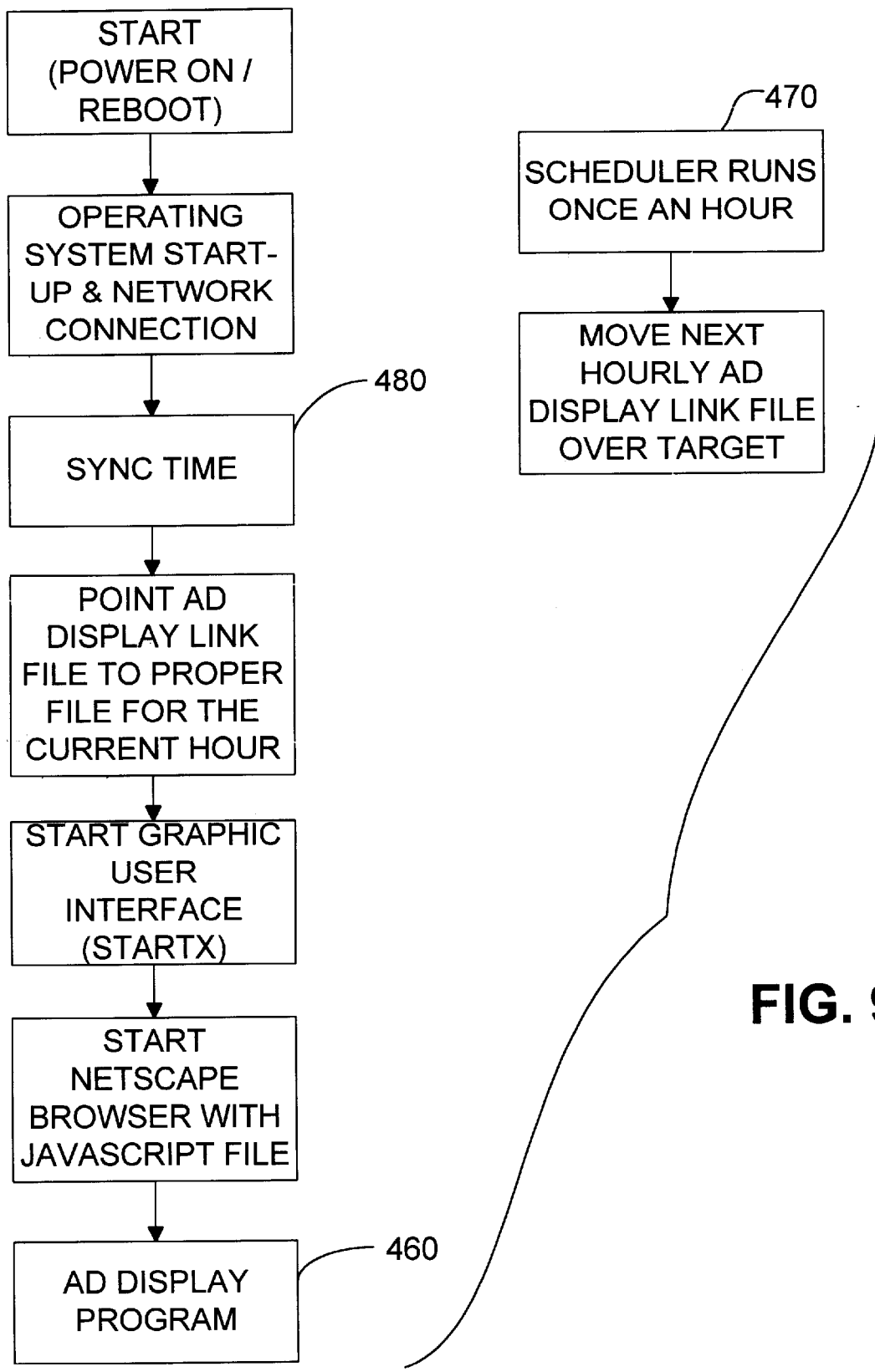
FIGS. 9A and 9B illustrate how digital ad files are processed and displayed on a GDU 40.
Figure 9B:
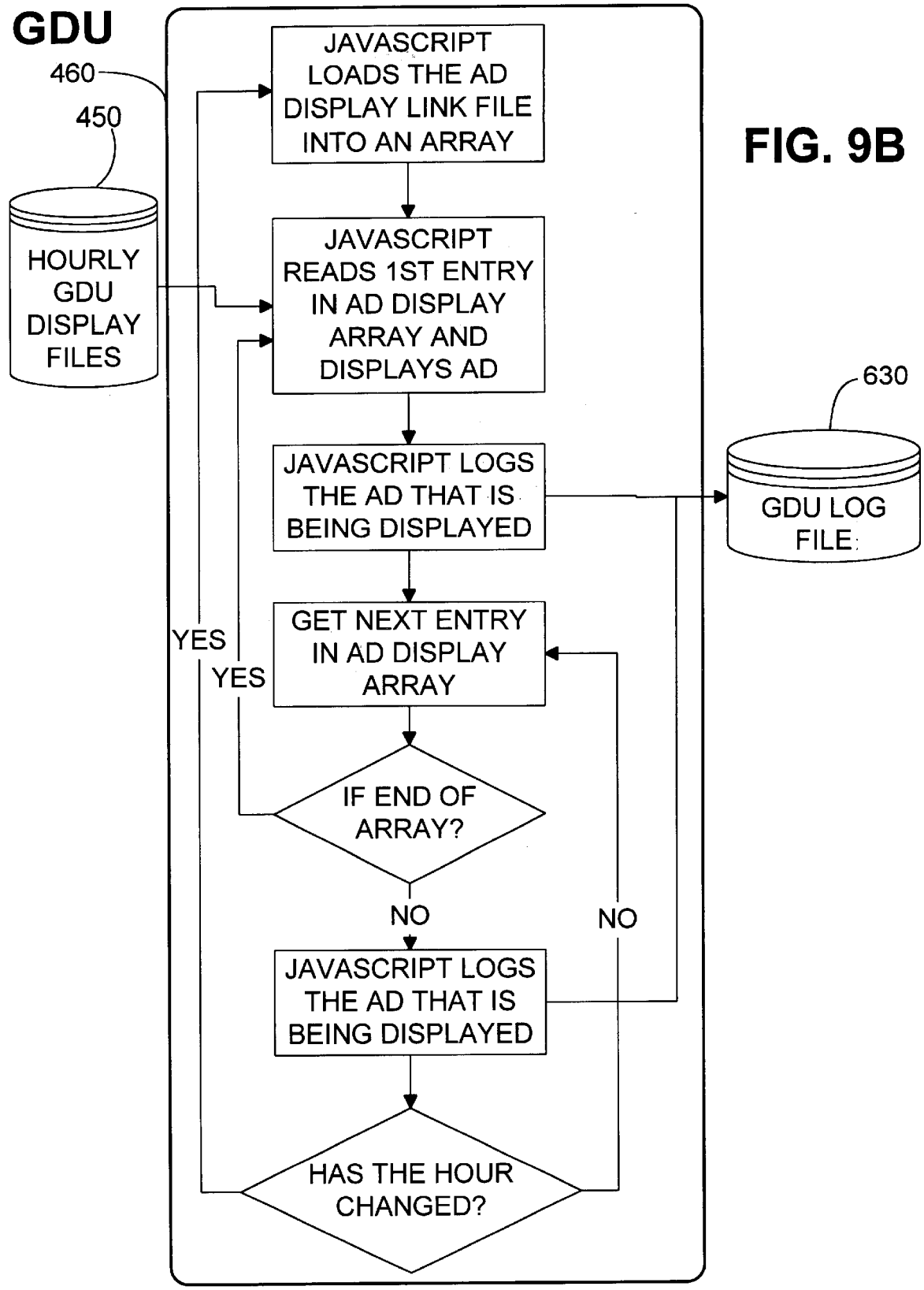
Figure 10:
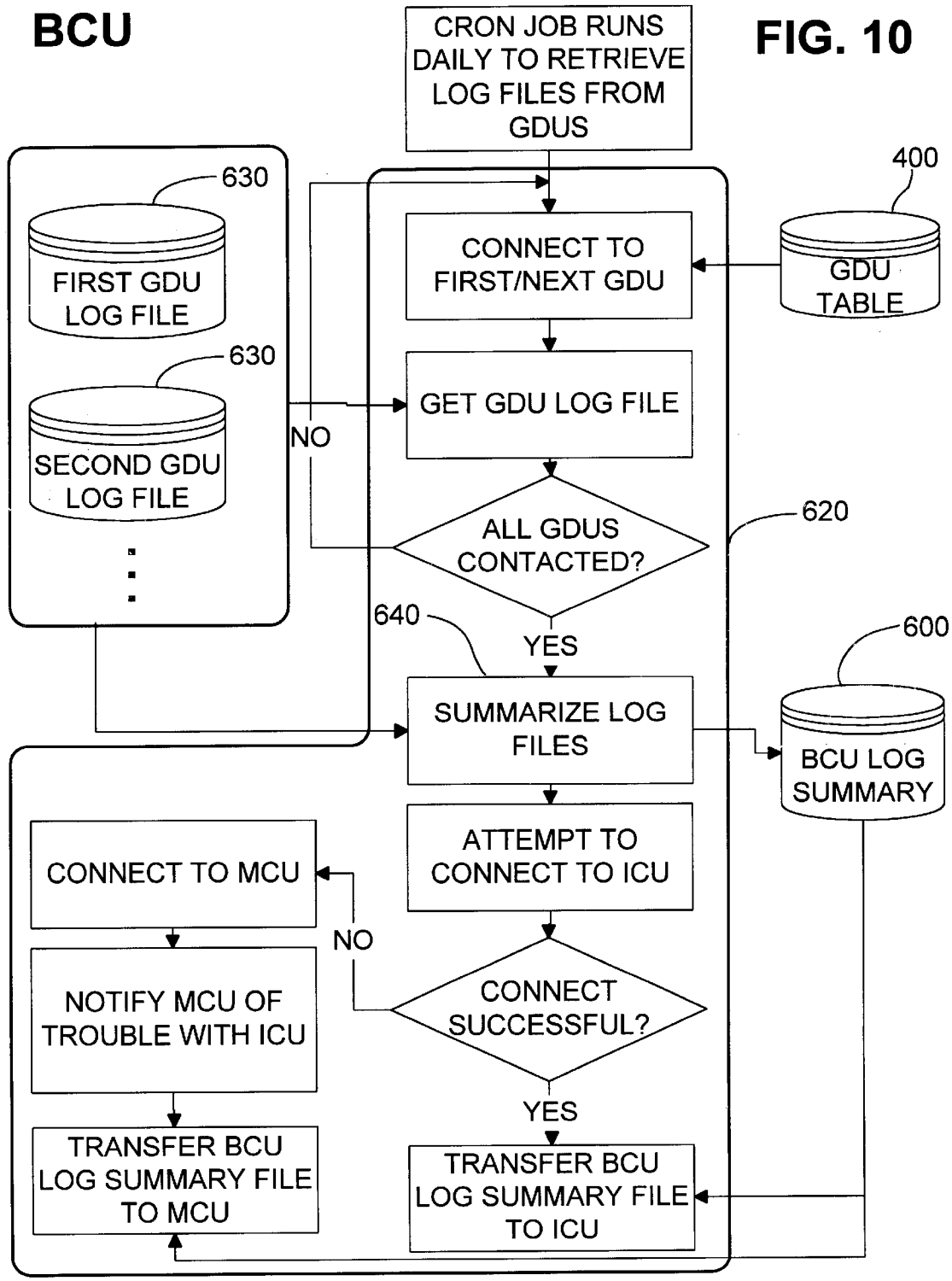
FIG. 10 portrays some higher level BCU 30 processes including one aspect of the self-diagnosis feature of the instant invention.

Another function performed by the BCU 30 is the retrieval of ad log information from the GDU 40 for transmission to the MCU 10. As is generally illustrated in FIG. 10, in the preferred embodiment this operation will be performed at least once a day even if there have been no ad updates arriving from the ICU 20. As has been mentioned previously, it is expected that clients will typically want some assurance that their ads have actually been played. In the preferred embodiment, an ad is not scheduled to run at any particular time within the hour on a GDU 40, but instead is played repeatedly during a particular hour, subject to the constraint that every ad scheduled to run during that same hour is played an equal number of times. This means that, depending on the advertising load for a particular GDU 40, an ad may run a few or several times in the course of a given hour. An advertiser will typically want to know exactly how many times each ad has appeared on each GDU 40 and that information is provided as part of the preferred embodiment. A part of the software resident on each GDU 40 continuously writes an identifier record to a log file 630 as each ad is actually played (FIG. 9B). Additionally, the instant inventors contemplate that a minimum number of ad plays during an hour can be guaranteed to an advertiser by limiting the total number of different ads scheduled to run that hour and by reducing the number and length of "public service" messages relating to the weather, stock market, etc. The scheduling of ad play times would preferably be done primarily on the MCU 10.

Figure 11:
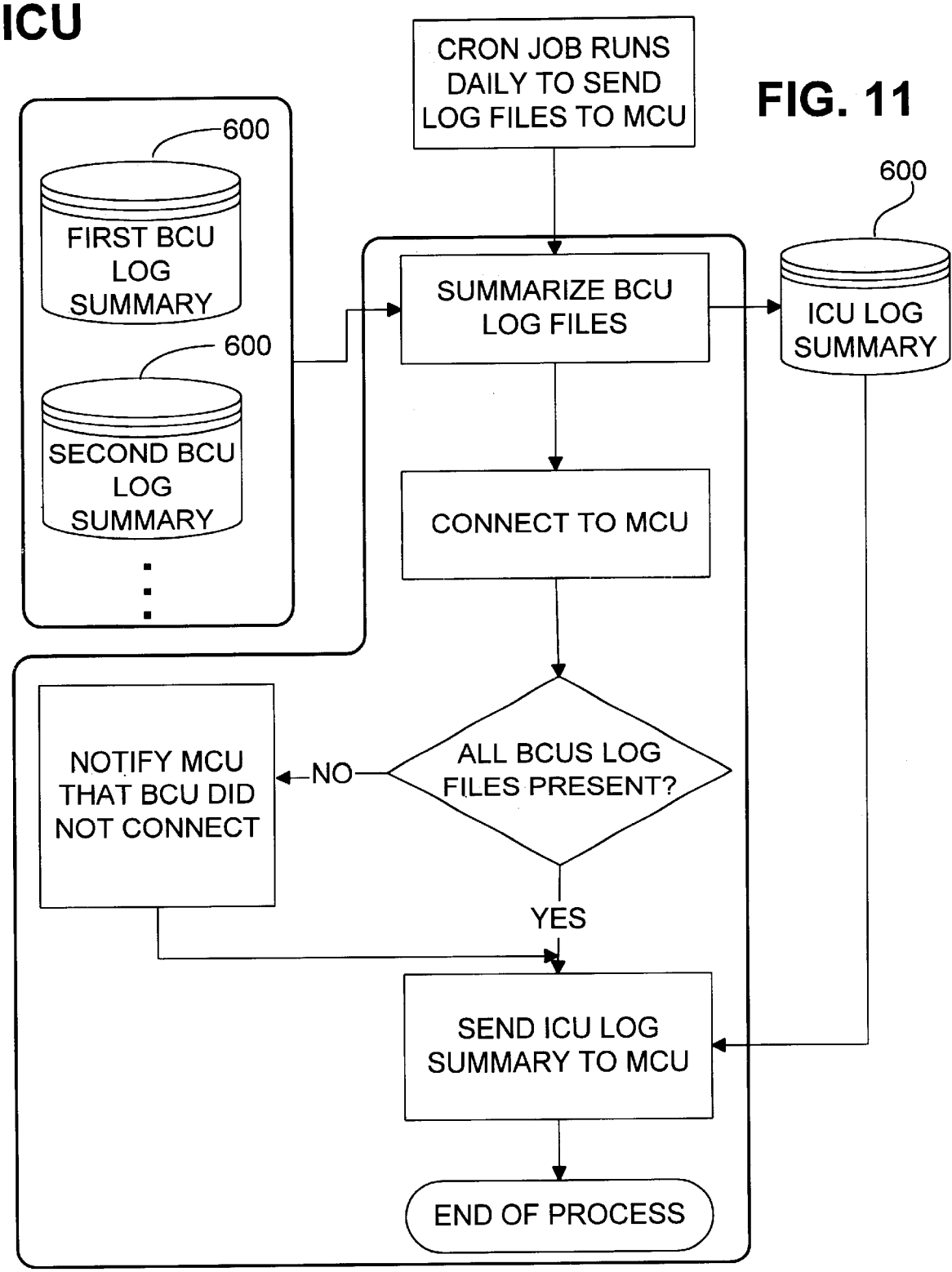
FIG. 11 contains an overview of a higher level ICU 20 process that includes one aspect of the self-diagnosis feature of the instant invention.

After the log files 630 from all of the GDUs 40 have been collected, a program 620 (FIG. 10) on the BCU 30 collates this information and produces a summary ad log 600 for this BCU 30, which summary log contains an hourly report of the number of times each ad has been displayed. The BCU 30 then contacts its ICU 20, preferably via ftp, and transfers its composite ad log to that ICU 20. If the ICU 20 cannot be reached due to, for example, hardware or communications problems, the BCU 30 then signals that fact to the MCU 10 as discussed below. Under normal circumstances and as illustrated in FIG. 11, the ICU 20 will, in turn, contact the MCU 10 at least daily and transfer all of the BCU 30 composite ad log files thereto. The MCU 10 will then process the information from the remote sites for distribution to the advertisers.

Ad Play Procedure

Turning now to the software that controls the display of ads on the GDU 40 as illustrated in FIG. 9B, control of the ad display function of a GDU 40 is maintained by the ad display program 460, which program executes on the GDU 40 and accepts as input the appropriate hourly display file 450 and graphics file 435 (FIG. 7) as created on the BCU 30. In more particular, in the preferred embodiment a scheduler 470 (FIG. 9A) runs once each hour and copies the appropriate hourly display file 450 for that hour to a predetermined file name, thereby erasing the file that was there previously. The same predetermined file name is read by the ad display program 460 each time the hour changes, however the actual file that it reads will change with the hour under the control of the scheduler 470. Alternatively, the scheduler 470 might instead change the value of a UNIX "symbolic link" to point to the appropriate hourly display file 450 for that hour. In either case, the ad display program 460 reads the designated hourly display file 450 and thereafter begins to sequentially process the play instruction file 140 names contained therein. At the change of the hour, the ad display program 460 loads in a new hourly display file 450 and plays these ads until the hour changes again.

Time Synchronization

Finally, in a time-of-day advertising system such as the instant invention, it is important that the display units 40 always be at "nearly" the correct time so that an advertiser can have some confidence that time sensitive ads are played on schedule. (For example, an advertiser that seeks to reach individuals that are lunch bound would not want that ad run at 2:00 p.m.) The internal clock of a GDU 40 can easily become inaccurate over time and ads played according to that clock will be misscheduled. Thus, in the preferred embodiment the UNIX "rdate" utility will be used to keep all of the system clocks in the network in synchronization. Those skilled in the art will know that the "rdate" utility is a program can be instructed to keep the clock of the computer upon which it is run in synchronization with any other specific computer in the network. Thus, it is anticipated that the "rdate" utility—or some functional equivalent thereof—will be installed on every computer in the network and each computer will be instructed to keep its clock in synchronization with the clock of the MCU 10.

Hardware Integrity Audit

According to a second aspect of the present invention, there is provided an ad display and distribution system substantially as described above, but wherein the interconnected network of computers is self-monitoring and generates an alarm at the MCU 10 if at least one remote computer is experiencing problems. Additionally, the instant embodiment is designed to alert the MCU 10 if the display device 90 becomes non-operational.

In the preferred embodiment and as is generally illustrated in FIG. 8, when a BCU is brought up after a power-up or a reboot, a standard UNIX boot sequence takes place. A part of that sequence is the initiation of the "cron" process or "daemon", cron being a well-known UNIX system level scheduling program that can be instructed to run other programs at specified times and/or specified time intervals.

As is illustrated in FIG. 8, one of the operations performed by a BCU 30 in the instant embodiment is to monitor the status 500 of each GDU 40 in its building (or buildings), a task that is performed at some fixed interval of time, preferably every 30 minutes. Cron will preferably be used to initiate a process that attempts to connect to—or communicate with—each of the GDUs 40 controlled by that BCU 30. The GDU table 400 resident on each BCU 30 provides a listing of all of the GDUs 40 connected thereto and how those GDUs 40 might be contacted (e.g., they might be contacted dial up modem, the Internet, LAN, etc.). If a GDU 40 cannot be contacted, that fact is noted and the MCU 10 is automatically notified. Additionally, the checking process will determine whether or not a web browser or other display program is running on each GDU 40, the preferred display program for the instant invention being the web browser software marketed under the "Netscape" trademark. If a web browser is not running, an attempt will be made to start one. Failing that, the MCU 10 will be contacted regarding this development. The program 500 proceeds sequentially through each GDU 40 in its GDU table 400 until all have been contacted.

Similarly and as illustrated in FIG. 10, each BCU 30—as part of the process that transfers the ad log files back to the MCU 10—will periodically attempt to contact the regional ICU 20 to which it is assigned. If the ICU 20 does not respond, the BCU 30 then preferably places a call to the MCU 10, transfers its files directly to the MCU 10, and notifies the MCU 10 that there is a problem of some sort with its ICU 20. The MCU 10 will then respond by notifying the system administrator or other supervisory personnel by sending e-mail to that person, by paging him or her, etc.

Additionally, on those days when ad data is transmitted to one or more of the ICUs 20, the MCU 10—if it is unable to contact a particular ICU 20— will notify the appropriate individual of that fact. However, since the MCU 10 may not contact every ICU 20 every day (i.e., because ad data may not be transmitted every day), the BCU 30 to ICU 20 check described previously may potentially prove to be more effective at uncovering hardware, software, and communications problems.

Figure 13:
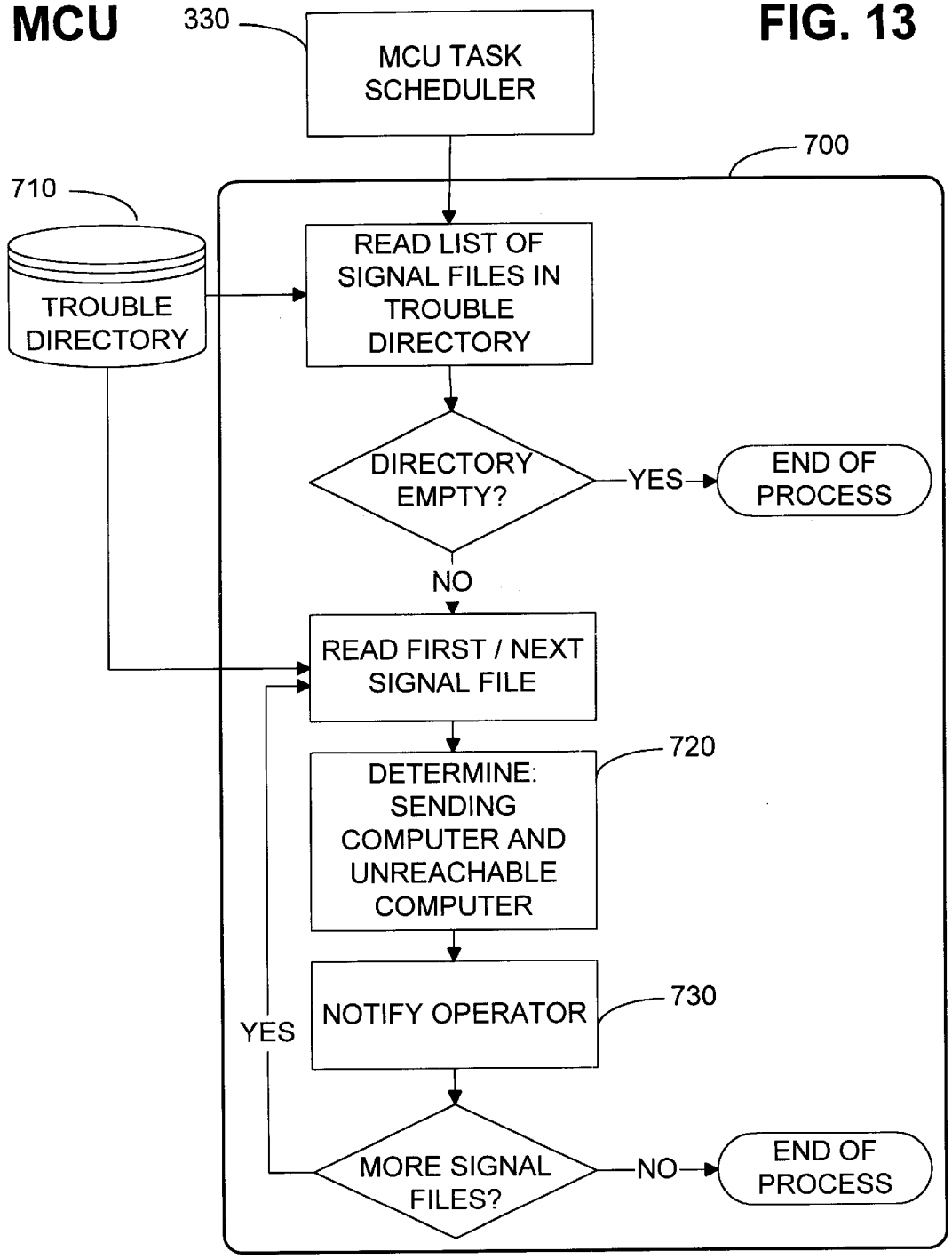
FIG. 13 contains a schematic illustration of the MCU 10 logic involved in the signaling function of the instant invention.

Each ICU 20 expects to receive files at least once each day—such as the ad log files—from all of BCUs 30 assigned to it (FIG. 11). In the event that a particular ICU 20 detects that files from a particular BCU 30 have not been received by the appropriate time, that ICU 20 contacts the MCU 10 and reports that fact. The MCU 10 in turn notifies the appropriate systems person. Note that, in the preferred embodiment, the ICU 20 will not attempt thereafter to contact the BCU 30 but rather will wait on the BCU 30 to contact it. This is because the BCU 30 may have already transferred its ad log file to the MCU 10, a situation which might occur if, for example, the BCU 30–ICU 20 communications link had been disabled, but the BCU 30 was otherwise functioning normally.

Where it is necessary for a remote unit to contact the MCU 10, that contact might be made in many different ways, but a preferred method of doing so would be to open a network connection to the MCU 10 (e.g., via ftp) and place a "signal" file in a particular MCU "trouble" directory that is "watched" by the MCU 10. As is illustrated in FIG. 13, a process 700 on the MCU 10 periodically checks the trouble directory 710 for new signal files and, when one is detected, reads that file and thereafter responds to whatever condition has been signaled. The signal file would at minimum contain the identity of the computer that sent the signal, the identify of the computer it was trying to reach, and the nature of the problem. The process 700, after reading this information (step 720), would be expected to contact the computer operator (step 730) so that corrective action can be taken. This contact might take the form of a printed message at the console of the MCU 10, a phone call to a pager, etc. In those circumstances where a remote computer cannot reach the MCU 10 to deposit a signal file, alternative provisions could be made for it to contact a service technician (if one is available in that city) or the network operator via an alphanumeric pager using conventional software and telecommunications tools.

Finally, as part of the instant network integrity check, the instant inventors contemplate that this same scheme could be used to notify the MCU 10 upon the failure of a GDU display device 90. By way of explanation, most modern computer languages, including those preferably utilized by the instant invention, allow the querying of I/O ports so that the logical contact closure achieved by an active device can be determined. In the preferred embodiment, an LCD display will be used as the GDU displace device 90. Additionally, a GDU display monitor 125 will preferably be placed in view of the fluorescent tube of the LCD, the GDU display monitor 125 preferably being a photoelectric device responsive to light emanating from the fluorescent tube. The GDU display monitor 125 will also be electrically connected via wire 115 to an I/O port of the GDU 40. The state of the I/O port associated with the display monitor 125 will be queried periodically by each GDU 40 and, if the GDU display monitor 125 indicates the fluorescent tube's illumination has dropped below a preset threshold, the attached BCU 30 will be notified of that fact. This condition will then trigger a network alarm and subsequent notification of the MCU 10—preferably by using a "signal" file as described previously. Obviously, if the display device 90 is not an LCD-type display but is instead, for example, a conventional computer monitor, the GDU display monitor 125 would need to be modified accordingly. For example, the GDU display monitor 125 could alternatively be a small photoelectric sensor attached near one corner of the face of the display device 90, and the GDU 40 might be programmed to periodically "light up" a region of the screen proximate to the display monitor. An error condition would then be generated if the display monitor 125 could not sense the "lighted" area at the time that it was scheduled to appear. Of course, there are any number of other sensor types and ways of attaching those sensors so that the status of the display device 90 might be automatically determined. Other sensors that might be adapted to work with conventional or LCD monitors include heat sensors, current sensors, magnetic field sensors, etc. But, however the determination might be made, the instant invention is designed to relay the status of an inoperational monitor back to the MCU 10 through its signaling system.

Additional Advantages

Among the many advantages of the instant invention is that it is specifically designed to be incrementally increased in size as needed. In more particular, it is a scaleable network topology to which additional ICUs 20, BCUs 30, and GDUs 40 can easily be added as needed. New hardware can readily be incorporated into the system as demand warrants it. Expansion of the ad network to another city amounts to placing the appropriate ICU20/BCU 30/GDU 30 hardware in place, providing the communications links between them, and modifying the ICU table 320 to reflect the presence of the new units. Additionally, new technologies can easily be incorporated into the system and new display hardware, communications methods, and software for descriptions of ads installed and tested in only one part of the network, thereby providing a live test without risking disruption of the entire system.

Finally, an ad distribution network such as that described herein is designed to minimize the cost of—and CPU overhead associated with—the distribution of potentially very large digital ad files to a multiplicity of elevator displays. By constructing the instant network as a true hierarchy, communications costs are distributed among several computers, rather than being born by a single central server.

While the inventive device has been described and illustrated herein by reference to certain preferred embodiments in relation to the drawings attached hereto, various changes and further modifications, apart from those shown or suggested herein, may be made therein by those skilled in the art, without departing from the spirit of the inventive concept, the scope of which is to be determined by the following claims.

What is claimed is:

1. A networked computer system for the distribution and display of short messages in elevators, said short messages being contained within digital ad data files, comprising:
   (a) a computerized main control unit, said computerized main control unit consisting of at least a hard disk, said hard disk for the storage of said digital ad data files thereon;
   (b) a plurality of individually addressable computerized graphic display units spaced remotely from said computerized main control unit,
      wherein each of said plurality of computerized graphic display units is in a building not containing said computerized main control unit, and,
      wherein each of said plurality of computerized graphic display units is adapted to receive communications directly from said computerized main control unit,
   each of said plurality of computerized graphic display units consisting of at least,
      (b1) a computer CPU, and,
      (b2) at least one display device attached to said computer CPU, each of said at least one display devices being for the display of said digital ad data files; and,
   (c) a plurality of communications links, wherein each of said plurality of computerized graphic display units are connected to said main control unit by one of said plurality of communications links, thereby making possible the transmission of digital ad files to each of said at least one computerized graphic display units from said main control unit.

2. A networked computer system according to claim 1 wherein each of said plurality of communications links of step (c) is selected from the group consisting of a telephone line, a wireless communications connection, an ethernet line, a satellite link, a serial line, a parallel line, a coax cable, a twisted pair line, or a fiber optic cable.

3. A method for the distribution and display of short messages in elevators, wherein is provided the ad distribution system of claim 1, and wherein is provided at least one digital ad file that resides on said hard disk of said computerized main control unit, comprising the steps of:
   (a) selecting at least one digital ad file from said at least one digital ad files which reside on said main control unit;
   (b) identifying at least one graphic display unit that is to display said selected digital ad file;

(c) transmitting said selected digital ad files from said main control unit to said identified graphic display unit, thereby creating at least one ad display file on each identified graphic display unit; and, (d) displaying at least a portion of said at least one ad display file on said display device according to a predetermined time schedule.

4. A method according to claim 3, wherein at least one of said computerized graphics display units cannot be contacted, and wherein each of said graphics display units has an identification code associated therewith, further comprising the steps of:

(e) automatically identifying at least one of said at least one of said graphics display units which cannot be contacted;

(f) determining for each of said at least one identified units which cannot be contacted an associated identification code; and, (g) generating a signal representative of at least one of said determined associated identification codes.

5. A networked computer system according to claim 1, wherein at least one of said at least one computerized graphic display units, further comprises:

(b3) a display device sensor, said display device sensor being placed proximate to said display device, monitoring an operational status of said display device, and being in electronic communication with said computer CPU.

6. A networked computer system according to claim 5, wherein said display device is an LCD display device and said display device sensor is a photoelectric sensor.

7. A method for the collection and processing of ad log information from an individually addressable graphic display unit in an elevator,
wherein is provided a remote processing unit in electronic communication with said graphic display unit and situated remotely therefrom,
comprising the steps of:

(a) providing to said graphic display unit from said remote processing unit a plurality of different digital ads and a predetermined ad play schedule;

(b) playing said plurality of digital ads on said graphic display unit at least approximately according to said predetermined ad play schedule;

(c) recording at said graphic display unit at least an actual date and a time at which each of said plurality of digital ads is played, thereby creating an ad log file;

(d) initiating a request for said graphic display unit to transmit a representation of said ad log file to said remote processing unit;

(e) transmitting said representation of said ad log file from said graphic display unit to said remote processing unit;

(f) performing steps (d) and (e) as required;

(g) determining an actual number of times each of said plurality of ads was played from any representations of ad log files so transmitted; and, (h) displaying a value representative of said actual number of times each of said plurality of ads was played.

8. A method for the collection and processing of ad play data from a graphic display unit in an elevator according to claim 7, wherein said request for said graphic display unit to transmit a representation of said ad log file to said remote processing unit originates on said remote processing unit.

9. A method for the collection and processing of ad play data from a graphic display unit in an elevator according to claim 7, wherein said request for said graphic display unit to transmit a representation of said ad log file to said remote processing unit originates on said graphic display unit.

10. A method according to claim 7, wherein step (g) further includes the steps of:

(g1) transmitting said representation of said ad log file from said remote processing unit to a main processing unit, and, (g2) determining within said main processing unit from said representation of said ad log file unit an actual number of times each of said plurality of ads was played.

11. A method according to claim 7, wherein steps (d) to (e) are repeated at predetermined time intervals.

12. A method for the distribution and display of short messages in elevators, wherein is provided
a computerized main control unit having a hard disk containing a plurality of digital ad files,
a plurality of individually addressable graphic display units in electrical communication with said computerized main control unit,
each of said plurality of graphic display units being positioned remotely from said computerized main control unit,
wherein each of said plurality of graphic display units is in a building different from said computerized main control unit, and
each of said plurality of graphic display units having a display device which is positionable to be viewable within an elevator cab,
each of said display devices being for the display of digital ads, and,
each of said at least one graphic display units for the display of said at least one digital ad file on said display device, comprising the steps of:

(a) selecting a digital ad file, said digital ad file containing at least one selected digital ad;

(b) identifying an individual graphic display unit from among said plurality of individually addressable graphic display units, said identified graphic display unit having an identified display unit associated therewith;

(c) assembling a play schedule for said identified graphic display unit,
said play schedule specifying at least times during when said selected digital ad is to be displayed on said display device, and,
said play schedule depending at least on said identified graphic display unit and said selected digital ad file;

(d) directly transmitting said play schedule and said digital ad file from said main control unit to said identified graphic display unit; and, (e) displaying said digital ad on said identified display unit according to said assembled play schedule.

13. A method according to claim 12, step (d) includes the step of:

(d1) transmitting said play schedule and said digital ad file to an intermediate control unit, (d2) transmitting said play schedule and said digital ad file from said intermediate control unit to said identified graphic display unit.

14. A networked computer system for the distribution and display of short messages in elevators, said short messages being contained within digital ad data files, comprising:

(a) a computerized main control unit, said computerized main control unit consisting of at least a hard disk, said hard disk being for the storage of said digital ad data files thereon;

(b) at least one computerized intermediate control unit situated remotely from said computerized main control unit;

(c) at least one individually addressable computerized graphic display unit, each of said at least one computerized graphic display units being situated remotely from said computerized main control unit and said computerized intermediate control unit, and, each of said at least one computerized graphic display units being in building different from said computerized main control unit and said computerized intermediate control unit, each of said at least one computerized graphic display units consisting of at least, (c1) a computer CPU, and, (c2) at least one display device attached to said computer CPU, each of said at least one display devices for the display of said digital ad data files, wherein each of said at least one computerized graphic display units is adapted for direction communication with at least one of said at least one computerized intermediate control units; and, (d) a plurality of communications links, wherein (d1) said computerized main control unit and each of said at least one computerized intermediate control units are positionable to be in electronic communication with each other via at least one of said plurality of communications links, thereby making possible the transmission of digital ad files from said computerized main control unit to each of said at least one computerized intermediate control units, and, (d2) each of said at least one computerized graphic display units are positionable to be in direct communication with a predetermined computerized intermediate control unit by one of said plurality of communications links, thereby making possible the transmission of digital ad files to each of said at least one computerized graphic display units from a intermediate control unit connected thereto.

15. A method for the distribution and display of short messages in elevators, wherein is provided the ad distribution system of claim 14, and wherein is provided at least one digital ad file that resides on said hard disk of said computerized main control unit, comprising the steps of:

(a) selecting at least one digital ad file from said at least one digital ad files which reside on said main control unit;

(b) identifying at least one graphic display unit that is to display said selected digital ad file;

(c) for at least one of said at least one identified graphic display units, identifying an intermediate control unit that is connected thereto;

(d) transmitting said selected digital ad files from said main control unit to said identified intermediate control units, thereby creating transmitted digital ad files on said identified intermediate control units;

(e) transmitting at least a portion of said transmitted digital ad files from each of said identified intermediate control units to said identified graphic display units, thereby creating at least one ad display file on each identified graphic display unit; and, (f) displaying at least a portion of said ad display files on said display device according to a predetermined time schedule.

16. A method according to claim 15, wherein at least one of said computerized graphics display units cannot be contacted, and wherein each of said graphics display units has an identification code associated therewith, further comprising the steps of:

(g) automatically identifying at least one of said at least one of said graphics display units which cannot be contacted;

(h) determining for each of said at least one identified units which cannot be contacted an associated identification code; and, (i) generating a signal representative of at least one of said determined associated identification codes.

17. A networked computer system according to claim 14, wherein at least one of said at least one computerized graphic display units, further comprises:

(c3) a display device sensor, said display device sensor being placed proximate to said display device, monitoring an operational status of said display device, and being in electronic communication with said computer CPU.

18. A networked computer system according to claim 17, wherein said display device is an LCD display device and said display device sensor is a photoelectric sensor.

19. A method for the distribution of short messages over a computer network and display of said short messages in elevators, wherein is provided a computerized main control unit, at least one digital message accessible by said computerized main control unit, each of said at least one digital messages including at least one command file and one digital ad file associated therewith, at least one computerized intermediate control unit, each of said at least one computerized intermediate control units being in electrical communication with said computerized main control unit, and, a plurality of individually addressable graphic display units, each of said graphic display units being in electrical communication with at least one of said intermediate control units, each of said plurality of graphic display units being positioned remotely from any computerized intermediate control unit with which it is in electrical communication, each of said plurality of graphic display units being in a building different from any computerized intermediate control unit, each of said plurality of graphic display units further being in a building different from said computerized main control unit, each of said plurality of graphic display units being adapted for direct communication with at least one of said at least one computerized intermediate control units, and, each of said plurality of graphic display units having a display device which is positionable to be viewable within an elevator cab, comprising the steps of:

(a) selecting at least one digital message from among said at least one digital messages, said selected digital message including at least a selected command file and a selected digital ad file;

(b) identifying at least one graphic display unit that is to display said selected digital ad file;

(c) for each identified graphic display unit,
- (c1) automatically identifying an intermediate control unit that is in electrical communication with said identified graphic display unit;
- (c2) transmitting at least a portion of said selected digital message from said main control unit to said identified intermediate control unit, thereby creating at least one transmitted digital message file on said identified intermediate control unit;
- (c3) directly transmitting at least a portion of said at least one transmitted digital message files from said identified intermediate control unit to said identified graphic display unit, thereby creating at least one ad display file on each identified graphic display unit; and, (d) displaying at least a portion of said at least one ad display files on said display device according to a predetermined time schedule.

20. A method according to claim 19, wherein step (c3) includes the steps of:

- (i) assembling an ad play schedule for said identified graphic display unit from said at least one transmitted digital message files on said identified intermediate control unit, and,
- (ii) transmitting said ad play schedule and at least a portion of said transmitted digital message files from said selected intermediate control unit to said identified graphic display unit, thereby creating at least one ad display file on said identified graphic display unit.

21. A method according to claim 19, wherein step (c2) includes the steps of:

- (i) transmitting said at least said selected digital ad file and at least a portion of said selected command file to said identified intermediate control unit, thereby creating at least one transmitted digital ad file on said identified intermediate control unit.

* * * * *